United States Patent
Halsell

(10) Patent No.: US 7,203,496 B2
(45) Date of Patent: Apr. 10, 2007

(54) STORING QUERY RESULTS TO REDUCE NUMBER PORTABILITY QUERIES IN WIRELESS NETWORK

(75) Inventor: Victoria M. Halsell, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 360 days.

(21) Appl. No.: 10/767,909

(22) Filed: Jan. 29, 2004

(65) Prior Publication Data
US 2005/0170837 A1 Aug. 4, 2005

(51) Int. Cl.
*H04Q 7/20* (2006.01)
(52) U.S. Cl. .............. 455/445; 455/432.1; 379/221.13
(58) Field of Classification Search ................ 455/417, 455/432.1, 433, 445, 461, 414.1, 426.1, 456.1–456.6, 455/552.1–553.1; 379/221.13; 370/338
See application file for complete search history.

(56) References Cited

U.S. PATENT DOCUMENTS

| | | | |
|---|---|---|---|
| 5,440,730 A | | 8/1995 | Elmasri et al. |
| 5,717,748 A | | 2/1998 | Sneed, Jr. et al. |
| 5,717,749 A | | 2/1998 | Sneed, Jr. et al. |
| 5,953,663 A | * | 9/1999 | Maupin et al. .............. 455/445 |
| 5,974,129 A | | 10/1999 | Bopnar |
| 6,259,783 B1 | * | 7/2001 | Tewani et al. ............... 455/445 |
| 6,421,442 B2 | * | 7/2002 | Slutsman et al. ...... 379/221.13 |
| 6,424,832 B1 | * | 7/2002 | Britt et al. ................... 455/445 |
| 6,625,273 B1 | * | 9/2003 | Ashdown et al. ...... 379/221.13 |
| 7,054,652 B2 | * | 5/2006 | Luis ............................ 455/461 |
| 2001/0016039 A1 | | 8/2001 | Slutsman et al. |
| 2005/0176448 A1 | * | 8/2005 | Klockner ..................... 455/466 |

OTHER PUBLICATIONS

Communication—European Search Report, no date listed.

\* cited by examiner

*Primary Examiner*—Charles Appiah
*Assistant Examiner*—Olivia Marsh

(57) ABSTRACT

A telecommunication system includes: a first mobile switching center associated with a directory number, a local number portability data storage device in communication with the first mobile switching center, and a second mobile switching center in operative communication with the first mobile switching center and associated with wireless service to a mobile station. A subscriber associated with the mobile station has ported the directory number from the first mobile switching center to wireless service via another mobile switching center. In several embodiments, a method of relating the directory number to the mobile station for an incoming call is provided. The directory number is associated with a first mobile switching center and wireless service to the mobile station is associated with a second mobile switching center. Ultimately, in each embodiment of the method, the incoming call is forwarded from the first mobile switching center to another mobile switching center.

36 Claims, 10 Drawing Sheets

STORING QUERY RESULTS TO REDUCE NUMBER PORTABILITY QUERIES IN WIRELESS NETWORK

BACKGROUND OF INVENTION

The invention generally relates to number portability (NP) in a wireless network and associated methods for storing NP query results and using the stored results to avoid subsequent NP queries and return routing and location information for a mobile called party in response to a telephone call for a predetermined time period and will be described with particular reference thereto. However, it is to be appreciated that the invention is also amenable to other applications.

As referred to herein, intra-service or intra-network NP refers to certain NP features provided within a wireless network infrastructure serviced by a single wireless service provider. In contrast, inter-service or inter-network NP refers to certain NP features provided across multiple wireless network infrastructures, where each wireless network infrastructure may be serviced by different wireless service providers.

As is commonly known, NP exists in landline telephone networks and wireless networks. Separately, home location register (HLR) query support exists in wireless networks. Currently, in one standard implementation of wireless NP, when a network home location register (HLR) is queried and returns an error in the query response, NP logic will proceed to launch an inter-service NP query to locate the subscriber for routing information identifying a ported mobile station (MS) at another mobile switching center (MSC). Then, the ported MSC must perform an HLR query to determine location information associated with the subscriber's MS. In another standard implementation, the NP query is launched first and, if the subscriber's MS is not ported, then the home HLR query is performed in the normal manner.

Currently, if the standard implementation for wireless NP is used, when an NP query is launched, if the subscriber is indeed ported to another service provider, a routing number is returned that identifies the new or ported MSC associated with the subscriber. The old or home MSC must use this routing number to route the call to the new provider in order to locate the subscriber's mobile station. This scenario will occur for every call that comes in to the old or home MSC for the same subscriber. If the subscriber is a high traffic user, the cost to the service provider associated with the old MSC for NP queries is a significant expense, increasing accordingly relative to the traffic.

As can be appreciated from the foregoing, NP capabilities in wireless networks require repetitive NP queries for incoming calls to a ported subscriber. These repeated NP queries create an undesirable cost burden on wireless service providers associated with a ported subscriber's original telephone or directory number (DN). Thus, there is motivation for mechanisms addressing the above-referenced problems and others.

BRIEF SUMMARY OF INVENTION

In one aspect of the invention, a method of relating a directory number to a mobile station in a wireless network for an incoming call from a calling party using a calling party device to a called party using the mobile station is provided. The directory number is associated with a first mobile switching center and wireless service to the mobile station is associated with a second mobile switching center. The method includes: a) querying a local number portability data storage device for stored routing information associated with the directory number and time information associated with a date and time when a previous number portability query associated with the directory number returned the stored routing information, b) receiving a return result from the local number portability data storage device, c) determining if the return result from the local number portability data storage device includes the stored routing information, d) determining if the stored routing information is expired by determining if the time information associated with the stored routing information exceeds a first predetermined time threshold, and e) if the return result from the local number portability data storage device includes the stored routing information and if the stored routing information is not expired, forwarding the incoming call and the stored routing information to the second mobile switching center, wherein the stored routing information associates the directory number with the second mobile switching center.

In another aspect of the invention, a method of relating a directory number to a mobile station in a wireless network for an incoming call from a calling party using a calling party device to a called party using the mobile station is provided. The directory number is associated with a first mobile switching center and wireless service to the mobile station is associated with a second mobile switching center. The method includes: a) querying a local number portability data storage device for stored routing information associated with the directory number and time information associated with a date and time when a previous number portability query associated with the directory number returned the stored routing information, b) receiving a return result from the local number portability data storage device, c) determining if the return result from the local number portability data storage device includes the stored routing information, d) determining if the stored routing information is expired by determining if the time information associated with the stored routing information exceeds a first predetermined time threshold, e) if the return result from the local number portability data storage device does not include the stored routing information, advancing to step k), otherwise, if the stored routing information is not expired, forwarding the incoming call and the stored routing information to the second mobile switching center and the process is ended, wherein the stored routing information associates the directory number with the second mobile switching center, f) querying an external number portability database for current routing information associated with the directory number, g) receiving a return result from the external number portability database, h) determining if the return result from the external number portability database includes the current routing information, i) if the return result from the external number portability database includes the current routing information, forwarding the incoming call and the current routing information to the second mobile switching center, wherein the current routing information associates the directory number with the second mobile switching center, j) storing the current routing information and time information associated with a date and time when the associated number portability query was performed in the local number portability data storage device in relation to the directory number and the process is ended, k) querying a home location register associated with the first mobile switching center for location information associated with the mobile station, l) receiving a return result from the home location register, m) determining if the return result from the home location register includes the location information, and n) if the return result from the home location register includes the location information includes the location information, forwarding the incoming call to the mobile station and returning temporary routing information to a telecommunication switch serving the calling party and the process is ended, otherwise continuing the process with step f).

In still another aspect of the invention, a telecommunication system for relating a directory number to a mobile station for an incoming call from a calling party using a calling party device to a called party using the mobile station is provided. The telecommunication system includes: a first mobile switching center associated with the directory number, a local number portability data storage device in communication with the first mobile switching center, and a second mobile switching center in operative communication with the first mobile switching center and associated with wireless service to the mobile station. The first mobile switching center further includes: means for querying a local number portability data storage device for stored routing information associated with the directory number and time information associated with a date and time when a previous number portability query associated with the directory number returned the stored routing information, means for receiving a return result from the local number portability data storage device, means for determining if the return result from the local number portability data storage device includes the stored routing information, means for determining if the stored routing information is expired by determining if the time information exceeds a first predetermined time threshold, and means for forwarding the incoming call and the stored routing information to the second mobile switching center if the return result from the local number portability data storage device includes the stored routing information and if the stored routing information is not expired, wherein the stored routing information associates the directory number with the second mobile switching center.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
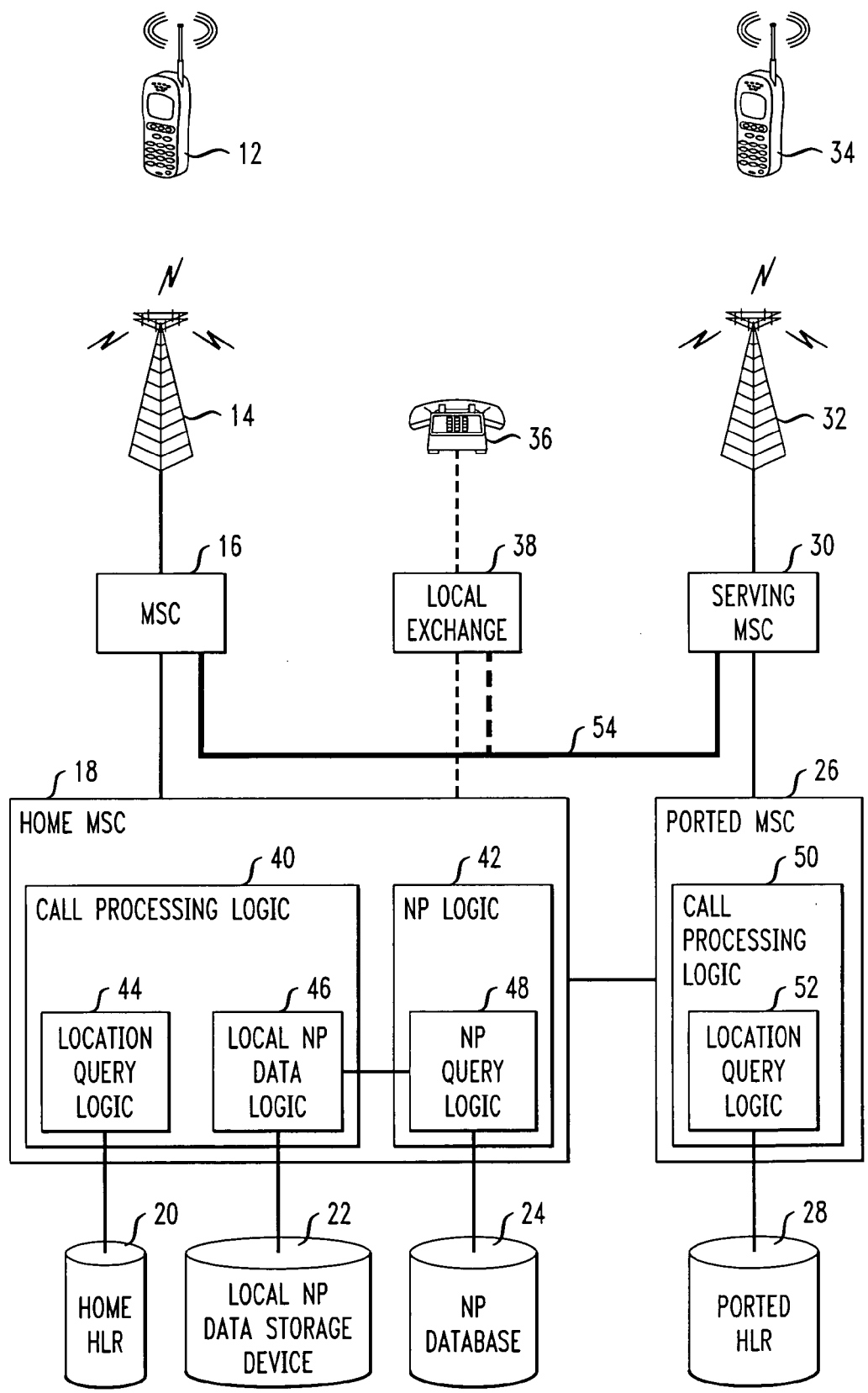
FIG. 1 is a block diagram of an exemplary telecommunication system providing a local NP query result storage feature at a home MSC.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

As can be appreciated from the foregoing, a mechanism is needed in a wireless network to store the last known routing number from an external NP database query associated with a ported subscriber to eliminate the need for subsequent NP database queries for subsequent calls to the same subscriber. Additionally, since subscribers may port multiple times, a mechanism is needed to set a time limit during which this stored routing number is presumed valid. This timer allows a wireless service provider associated with the wireless network to limit use of the stored number routing number to a defined period of time, thus reducing the possibility that the stored routing number is no longer valid.

In general, an exemplary embodiment of the invention provides NP logic in a wireless network to store the occurrence of a ported number return response for future use. The ported number return response may be stored within an MSC to which the incoming call was originated or within a peripheral storage device associated with the MSC. In one embodiment, the NP logic includes an expiration timer that limits use of the stored response beyond an expiration time. A process in the wireless network allows the routing information returned from the external NP database to be stored for a defined period of time. The stored routing information can be used for routing calls to a subscriber that has ported out of the network.

In an example, calling party A calls called party B which has ported to a new wireless network C. The call is first routed to the old wireless network (i.e., home MSC) of called party B. Currently, old wireless network B then performs an NP query after determining that called party B no longer resides on its switch. The NP query may return a routing number that identifies the new wireless network C (i.e., ported MSC). With the invention implemented, the home MSC (i.e., old wireless network B) stores this routing data that was received from the external NP database in memory and sets an expiration timer (e.g., 24 hours) for use of the routing data for call processing. The call will proceed to route to the ported MSC (i.e., new wireless network C).

When another call to called party B arrives at old wireless network B (since with NP all calls are still routed to the old wireless network), first old wireless network B retrieves the routing number of the new location for the subscriber from storage (e.g., internal memory), checks if the timer is expired, and, if the timer has not expired, routes the call to new wireless network C. Notably, no NP query fee was incurred for the second call.

Conversely, if old wireless network B finds the timer has expired, then a new NP query will be launched to retrieve the routing data. If routing data is returned, it is stored in the same manner as before and a new timer will be set. Note, the new routing data may or may not be the same as the expired routing data. For example, if the subscriber has ported again, it will not be the same.

As another example, this routing information can be stored for intra-network ports as well. For intra-network ports, the timer could be set to a higher value (e.g., approaching infinity) since the wireless service provider is in control of the intra-network porting and knows when a subscriber's DN is an intra-network port. With the time set to a higher value, even less or possibly no NP queries are needed for subscribers that have ported within the wireless service provider's network. This leads to increased cost savings to the wireless service provider by avoiding even more NP queries. Thus, subsequent calls to the subscriber would be re-routed to the new MSC with no NP query needed for a longer period of time (e.g., until the wireless network knows the intra-network port for the subscriber is no longer valid or current).

NP concepts currently exists in wireline, but due to the fixed nature of landline devices certain problems related to mobile stations are not handled in the wireline NP. Similarly, MSCs are currently capable of setting timers, but storage of NP query results and timers associated therewith, as well as checking for stored NP data, subsequent usage of the stored NP data, launching an NP query if the stored NP data is expired, and logic associated therewith, are new features for MSCs.

By implementing an embodiment of the invention, wireless NP logic in an MSC is able to bypass a number of NP queries, but still route the call to the new ported destination. An MSC implementing an embodiment of the invention can take dynamic routing data, store it, and re-use the stored data for subsequent calls that arrive for the same ported DN. The MSC is also able to correlate usage of this stored routing data with a timer, and if expired, proceed to launch another NP query to update the stored data for the ported subscriber.

Many wireless service providers are not ready to support NP for wireless networks. There have been lots of delays associated with implementation of wireless NP (even in the courts). The various embodiments of this invention allow wireless service providers to launch a significantly less amount of NP queries, thus saving costs of the avoided NP queries. Also, since wireless NP is a government mandate; wireless service providers are unable to charge end users usage fees (they are only able to charge small cost recovery fees similar to E911). The various embodiments of this invention also allow wireless service providers that have high amounts of traffic coming into their wireless network for ported subscribers to reduce the amount of NP query fees they would otherwise incur by storing the new routing data for the ported subscriber for a period of time.

With reference to FIG. 1, an exemplary telecommunication system 10 includes a first mobile station (MS) 12, a first base station (BS) 14, a first MSC 16, a home MSC 18, a home HLR 20, a local NP data storage device 22, an NP database 24, a ported MSC 26, a ported HLR 28, a serving MSC 30, a second BS 32, and a second MS 34. The first MS 12, first BS 14, and first MSC 16 are associated with a calling party leg of a call from a wireless network. Alternatively, if the call is from a landline network, a landline telephone device 36 and a local exchange 38 are associated with the calling party leg of the call. In varying capacities, the other components identified are associated with a called party leg of the call. Note that the ported MSC 26 also functions as the serving MSC 30 when the second MS 34 is within its new or ported "home" geographic area. Thus, FIG. 1 depicts a configuration when the second MS 34 is roaming. The home MSC 18, ported MSC 26, and serving MSC 30 may be in a common wireless network managed by one wireless service provider or in different wireless networks managed by different wireless service providers.

The home MSC 18 includes a call processing logic module 40 and an NP logic module 42. The call processing logic module 40 includes a location query logic module 44 and a local NP data logic module 46. The NP logic module 40 includes an NP query logic module 48. The ported MSC 26 also includes a call processing logic module 50. This call processing logic module 50 also includes a location query logic module 52. The call processing logic modules 40, 50 may be the same or different. The voice trunk 54 provides a voice channel between the first MSC 16 or local exchange 38 and the serving MSC 30.

It is understood that the various components shown in FIG. 1 may be implemented in hardware, software, or various combinations of hardware and software. Additionally, it is understood that the components may be combined in any suitable manner in actual implementation. For example, the local NP data storage device 22 may be incorporated within the home MSC 18 rather than as an external component.

In an exemplary scenario, a call is initiated by a calling party using the first MS 12 or landline telephone device 34 to a directory number (DN) associated with a called party using the second MS 32. The called party initially subscribed to wireless service to the second MS 32 from a wireless service provider that associated the second MS 32 with the home MSC 18. However, now wireless service for the second MS 32 and associated DN is associated with the ported MSC 26. In other words, the DN has been ported from the home MSC 18 to the ported MSC 26. Typically, this occurs when the called party or subscriber switches from one wireless service provider to a new wireless service provider having its own wireless network. However, this also occurs when a wireless service provider changes wireless service for the DN associated with the second MS 32 from the home MSC 18 to the ported MSC 26 within its own wireless network. The wireless service provider may port the DN within its own wireless network, for example, when the subscriber upgrades his/her wireless service from TDMA to GSM. Regardless of the underlying circumstances, the original DN remains the same even though wireless service for the DN is ported from an original or previous home MSC to new home or ported MSC. Thus, the associated wireless service providers must now port incoming calls to the DN from the original or previous home MSC (i.e., home MSC 18) to the new home or ported MSC (i.e., ported MSC 26).

Given the initial conditions described above, the scenario begins when the home MSC 18 receives an incoming call to the ported DN associated with the second MS 34. The home MSC 18 no longer provides wireless service to the ported DN. However, as an original or previous provider of wireless service to the ported DN, the home MSC 18 receives all incoming calls to the ported DN and must obtain routing information with which to forward the call. Under these circumstances, the normal process of querying the home HLR 20 may be performed by the location query logic 44. However, an error message is returned by the home HLR 20 to the location query logic 44 because the location of the second MS 34 associated with the ported DN is no longer monitored by the home HLR 20. Thus, the NP query logic 48 must query the NP database 24 for routing information associated with the ported DN. It is understood that the NP database 24 within the telecommunication network 10 is external to the wireless network(s) and not operated by the wireless service provider associated with the wireless network(s). For example, currently regional NP databases provide portability information for DN's assigned to subscriber's within their respective geographic coverage area. Thus, the wireless service provider associated with the NP query is charged for the query and routing information for the ported DN is returned by the NP database 24 to the NP query logic 48. The routing information includes information that identifies the ported MSC 26. The home MSC 18 forwards the incoming call and associated routing information to the ported MSC 26. The incoming call may go directly from the home MSC 18 to the ported MSC 26, but it is likely that it will be routed through one or more intermediate MSCs to the ported MSC 26. The intermediate MSCs simply use the routing information to continue forwarding the call on to the ported MSC 26.

Within the home MSC 18, the NP query logic 48 also communicates the routing information associated with the ported DN to the local NP data logic module 46. The local NP data logic module 46 associates time information associated with a date and time when the NP query was performed with the routing information. The ported DN, routing information, and time information are communicated by the local NP data logic module 46 to the local NP data storage device 22. The local NP data storage device 22 stores the routing information and time information in relation to the ported DN so that this information can be retrieved when a subsequent incoming call to the ported DN is received by the home MSC 18.

In a subsequent incoming call to the ported DN, the home MSC 18 may query the local NP data storage device 22, via the local NP data logic module 46, for stored routing information for the ported DN before initiating an NP query to the NP database. The time information is retrieved by the local NP data logic module 46 along with the routing information. The local NP data logic module 46 evaluates the time information to determine whether or not to use the stored routing information depending on logic which considers the likelihood that the stored routing information is still valid. For example, the local NP data logic module 46 may expect routing information that was stored less than 24 hours ago to be valid. If the time information indicates that the stored routing information is less than 24 hours old, the home MSC 18 may forward the incoming call to the ported MSC 26 associated with the routing information.

Conversely, if the time information indicates that the stored routing information is more than 24 hours old, the home MSC 18 may perform another NP query to obtain current routing information and forwards the incoming call to an MSC associated with the current routing information. The current routing information may identify the same MSC as the previous NP query or it may identify a different MSC (i.e., indicating that the DN has been ported again). The current routing information is stored in the local NP data storage device 22 in the same manner as described above. The local NP data logic module 46 associates time information with a date and time of the second NP query with the current routing information and the current routing information and associated time information is stored in the local NP data storage device 22 in relation to the ported DN.

The ported MSC 26 receives the incoming call and the location query logic 52 queries the ported HLR 28 for location information regarding the second MS 34 in the normal manner. If the second MS is powered on and the subscriber's account is active with the wireless service provider associated with the ported MSC 26, the ported HLR 28 provides a return result to the location query logic 52 that includes the location information. Since the second MS 34 is roaming in a geographic area served by the serving MSC 30 in this scenario, the location information includes information that identifies the serving MSC 30. The ported MSC 26 uses the location information to forward the incoming call to the serving MSC 26 in the normal manner. The serving MSC 30 receives the incoming call and continues call processing in the normal manner. Eventually, the incoming call is routed from the serving MSC 30 to the second MS 34 via the second BS 32. After the incoming call is answered by the subscriber or another user at the second MS 34, a voice channel is connected from the incoming call leg to the serving MSC 30 via the voice trunk 54 in the normal manner.

The order of the query to the home HLR, query to the local NP data storage device, and query to the NP database from the home MSC 18 may be altered in various embodiments of the home MSC 18. For example, a first embodiment of the home MSC 18 may perform a query to the local NP data storage device and, if unsuccessful, perform a query to the home HLR. Then, if the HLR query is also unsuccessful, perform a query to the NP database. A second embodiment of the home MSC 18 may perform a query to the local NP data storage device and, if unsuccessful, perform a query to the NP database. A third embodiment of the home MSC 18 may perform a query to the home HLR and, if unsuccessful, perform a query to the local NP data storage device. Then, if the local NP data storage device query is also unsuccessful, query to the NP database.

Figure 2:
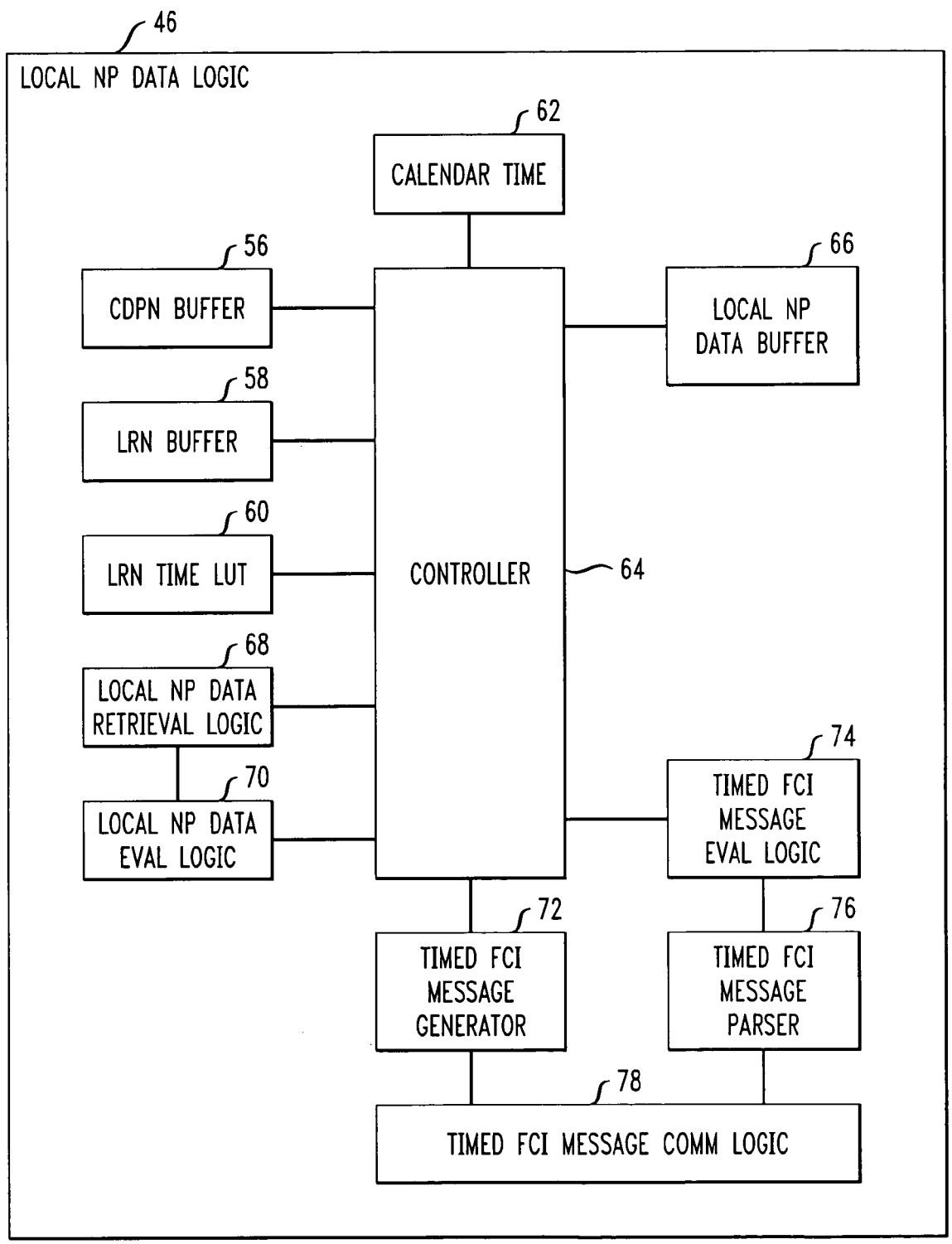
FIG. 2 is a block diagram of an exemplary local NP data logic module associated with the local NP query result storage feature.

With reference to FIG. 2, the local NP data logic module 46 includes a called party number (CDPN) buffer 56, a location routing number (LRN) buffer 58, an LRN time look-up table (LUT) 60, a calendar time process 62, a controller 64, a local NP data buffer 66, a local NP data retrieval logic 68, a local NP data evaluation logic 70, a timed forward call indicator (FCI) message generator 72, a timed FCI message evaluation logic 74, a timed FCI message parser 76, and a timed FCI message communication logic 78.

The CDPN buffer 56 serves as a storage area for the DN associated with an incoming call to the MSC. The LRN buffer 58 serves as a storage area for the routing information returned by the NP database in response to a query. The LRN time LUT 60 serves as a storage area for one or more predetermined thresholds with which to evaluate the time information associated with stored routing information for a corresponding DN. The calendar time process 62 maintains current date and time information and may be used to generate the time information associated with the routing information and in evaluation of stored routing information.

The LRN time LUT 60 is arranged to identify MSCs or one or more group of MSCs in various wireless networks associated with the telecommunication system 10 by LRN or ranges of LRN and relates each MSC or group of MSCs with a predetermined time threshold. Typically, the LRN time LUT 60 is loaded with default values (e.g., 24 hours) for the predetermined time threshold for each MSC or group of MSCs. However, the predetermined time threshold values may be programmable so that wireless service providers can adjust the threshold higher or lower and individually by MSC or MSC group. For example, a GUI may be used that permits an operator to select between a plurality of predetermined values (e.g., 4 hours, 8 hours, 12 hours, 16 hours, 20 hours, 24 hours, etc.) and/or to manually specify a predetermined time threshold as a default for all MSCs or MSC groups. Of course, the GUI may also permit the operator to individually set predetermined time thresholds for each MSC or MSC group.

The controller 64 is in communication with CDPN buffer 56, LRN buffer 58, LRN LUT 60, calendar time process 62, local NP data buffer 66, local NP data retrieval logic 68, local NP data evaluation logic 70, timed FCI message generator 72, and a timed FCI message evaluation logic 74. In other embodiments, the controller 64 may also be in communication with the timed FCI message parser 76 and timed FCI message communication logic 78. The controller 64 provides for overall control of the local NP data logic module 46 and its constituent processes.

The local NP data buffer 66 provides a storage area for the DN, routing information, and time information communicated by the local NP data logic module 46 to the local NP data storage device 66. The local NP data retrieval logic 68 submits a query for routing information and time information for a particular DN to the local NP data storage device 22. The local NP data retrieval logic 68 also receives return results from the local NP data storage device 22 in response to such queries. The local NP data evaluation logic 70 receives time information associated with stored routing information and a predetermined time threshold for a particular DN and determines whether or not the stored routing information may be used for forwarding an incoming call.

The timed FCI message generator 72, timed FCI message evaluation logic 74, timed FCI message parser 76, and timed FCI message communication logic 78 will be described in more detail below in conjunction with FIGS. 8–11.

The local NP data logic module 46 permits the MSC to store and retrieve routing information provided in return results received in response to NP queries. In the store operation, for example, the MSC received an incoming call to the DN, performed a query to the NP database, and received routing information in a return result from the NP database. The DN for the current incoming call is stored in the CDPN buffer 56 and the routing information from the NP database is stored in the LRN buffer 58.

In one embodiment of the local NP data logic module 46, the controller 64 reads the calendar time, including time and date information, from the calendar time process 62 when the routing information from the NP database is received to create the time information associated with the routing information. In this embodiment, the time information is a timestamp identifying approximately when the query to the NP database that returned the associated routing information was performed. In another embodiment, the controller 64 reads the calendar time, including time and date information (i.e., timestamp), from the calendar time process 62 when the routing information from the NP database is received and reads the predetermined time threshold from the LRN time LUT 60 corresponding to the routing information (i.e., LRN) stored in the LRN buffer 58. In this embodiment, the controller 64 adds the corresponding predetermined time threshold to the calendar time to create the time information. Here, the time information identifies a future calendar time after which the stored routing information can no longer be used by the MSC to forward an incoming call to the DN. In still another embodiment, the controller 64 reads the predetermined time threshold from the LRN time LUT 60 corresponding to the routing information (i.e., LRN) stored in the LRN buffer 58. In this embodiment, the time information must be continuously decremented as time elapses. Here, the time information identifies how much longer the MSC can use the associated routing information to forward an incoming call to the DN.

The controller 64 transfers the time information, contents of the CDPN buffer 56 (i.e., DN), contents of the LRN buffer 58 (i.e., routing information) to the local NP data buffer 66. The local NP data logic module 46 communicates the contents of the local NP data buffer 66 to the local NP data storage device 22 to store the routing information and time information in relation to the DN.

In the retrieve operation, for example, the MSC received an incoming call to the DN. The local NP data retrieval logic 68 queries the local NP data storage device 22 for stored routing information associated with the DN. The local NP data retrieval logic 68 receives a return result from the local NP data storage device 22 in response to the query. The return result, for example, includes an error message if the local NP data storage device 22 does not include stored routing information associated with the DN. If the local NP data retrieval logic 68 receives an error message, it is communicated to the controller 64 and call processing continues for the MSC with either a query to the NP database or a query to the HLR associated with the MSC.

If the local NP data storage device 22 includes stored routing information associated with the DN, the return result includes the stored routing information and time information associated with the stored routing information. If the return result includes stored routing information, the local NP data retrieval logic 68 notifies the controller 64 and communicates the stored routing information and associated time information to the local NP data evaluation logic 70. The controller 64 reads the predetermined time threshold from the LRN time LUT 60 corresponding to the routing information (i.e., LRN) and communicates the corresponding predetermined time threshold to the local NP data evaluation logic 70. The local NP data evaluation logic 70 compares the time information associated with the stored routing information to the predetermined time threshold to determine whether or not the stored routing information is expired.

In one embodiment, the time information associated with the stored routing information is a timestamp identifying approximately when the query to the NP database that returned the stored routing information was performed. In this embodiment, the local NP data evaluation logic 70 adds the predetermined time threshold to the time information associated with the stored routing information to identify a threshold calendar time after which the stored routing information is expired. Next, the local NP data evaluation logic 70 reads the current calendar time from the calendar time process 62 and compares the current calendar time to the threshold calendar time. If the current calendar time is before the threshold calendar time, the local NP data evaluation logic 70 communicates the stored routing and associated time information to the controller 64. The controller 64 transfers the stored routing information and associated time information to the local NP data buffer 66. Then, the MSC forwards the incoming call and stored routing information to the ported MSC. Conversely, if the current calendar time is after the threshold calendar time, the local NP data evaluation logic 70 communicates an error message to the controller 64 and call processing continues for the MSC with either a query to the NP database or a query to the HLR associated with the MSC.

Figure 3:
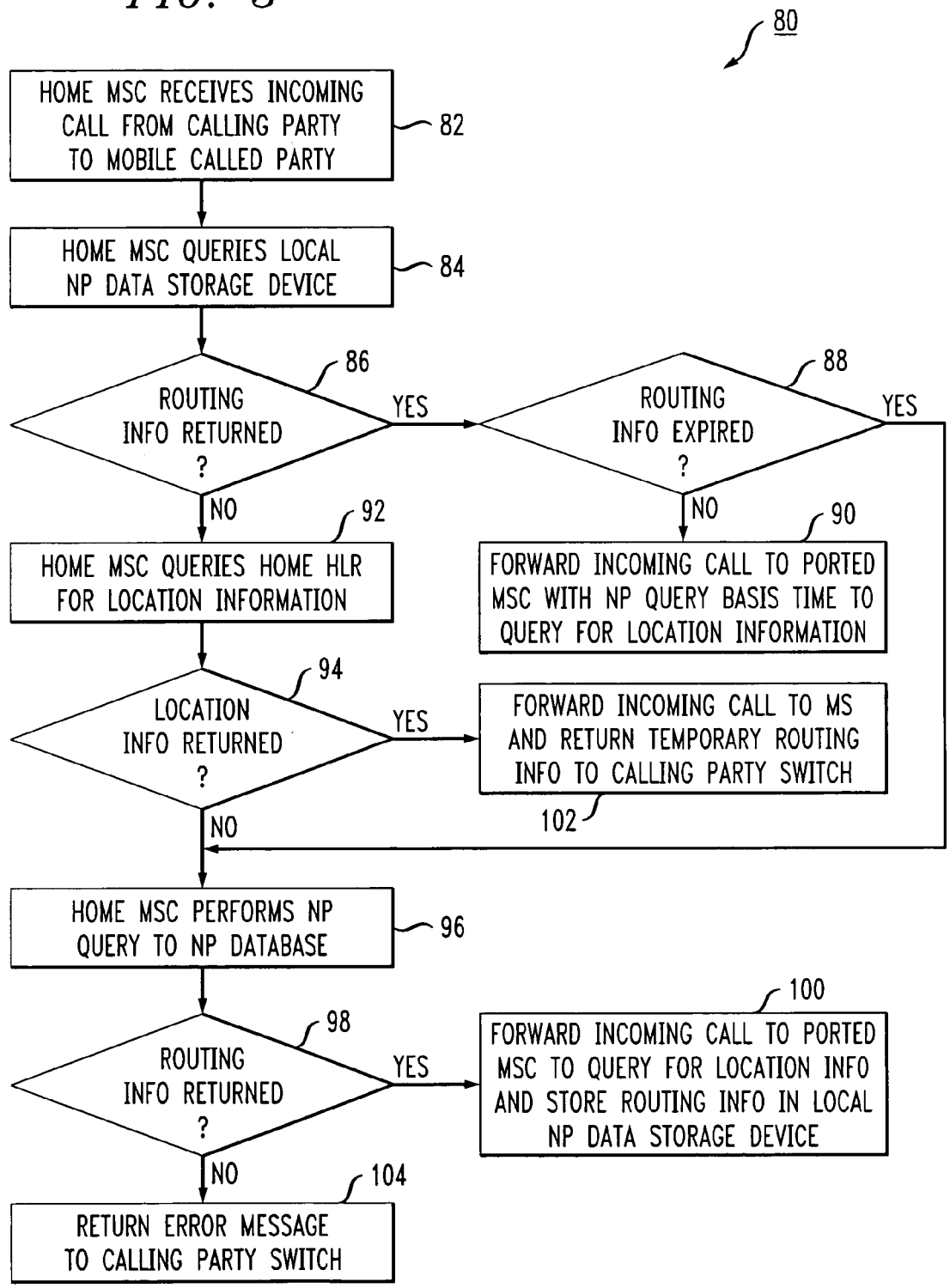
FIG. 3 is a flowchart of an embodiment of a process for a wireless service provider to reduce NP queries for a DN that is ported to a new MSC.

With reference to FIG. 3, an exemplary process 80 for a wireless service provider to reduce NP queries for a DN that is ported to a new MSC begins at step 82 when a home MSC receives an incoming call from a calling party to a DN associated with a mobile called party and an MS. At step 84, the home MSC queries a local NP data storage device for stored routing information associated with the DN and time information associated with a data and time when a previous number portability query associated with the DN returned the stored routing information (i.e., NP query basis time). Next, the process determines if the stored routing information is included in a return result from the local NP data storage device (step 86). If stored routing information is included in the return result from the local NP data storage device, at step 88, the process determines if the stored routing information is expired by determining if the time information associated with the stored routing information exceeds a predetermined time threshold. If the stored routing information is not expired, the home MSC forwards the incoming call to a ported MSC associated with the stored routing information, the stored routing information, and the time information (i.e., NP query basis time) so that the ported MSC can obtain location information associated with the mobile called party's MS (step 90).

At step 86, if stored routing information is not included in the return result from the local NP data storage device, the process advances to step 92 and the home MSC queries a home HLR for location information associated with the mobile called party's MS. Next, the process determines if the location information is includes in a return result from the home HLR (step 94). If the return result from the home HLR does not include the location information, at step 96, the home MSC queries the NP database for current routing information associated with the DN. Next, the process determines if the current routing information is included in a return result from the NP database (step 98). If the current routing information is included in the return result from the NP database, at step 100, the home MSC forwards the incoming call to a ported MSC associated with the current routing information so that the ported MSC can obtain location information associated with the mobile called party's MS. The home MSC also stores the current routing information and time information associated with a date and time when the associated NP query was performed in the local NP data storage device in relation to the DN.

At step 88, if the stored routing information is expired, the process advances to step 96 and continues as described above.

At step 94, if the return result from the home HLR includes the location information, the process advances to step 102 and the home MSC forwards the incoming call to the called party's MS and returns temporary routing information to a calling party switch.

At step 98, if the current routing information is not included in the return result from the NP database, the process advances to step 104 and the home MSC returns an error message to the calling party switch.

The various steps in the foregoing process 80 may be implemented by hardware, software, and/or combinations thereof within the home MSC 18 (FIG. 1), home HLR 20 (FIG. 1), local NP data storage device 22 (FIG. 1), and NP database 24 (FIG. 1). More specifically, steps 82, 84, 86, 88, 90, 92, 94, 96, 98, 100, 102, and 104 may be implemented at least in part by hardware, software, and/or combinations thereof within the home MSC 18 (FIG. 1). Steps 92 and 94 may be implemented at least in part by hardware, software, and/or combinations thereof within the home HLR 20 (FIG. 1). Steps 84 and 86 may be implemented at least in part by hardware, software, and/or combinations thereof within the local NP data storage device 22 (FIG. 1). Steps 96 and 98 may be implemented at least in part by hardware, software, and/or combinations thereof within the NP database 24 (FIG. 1).

Figure 4:
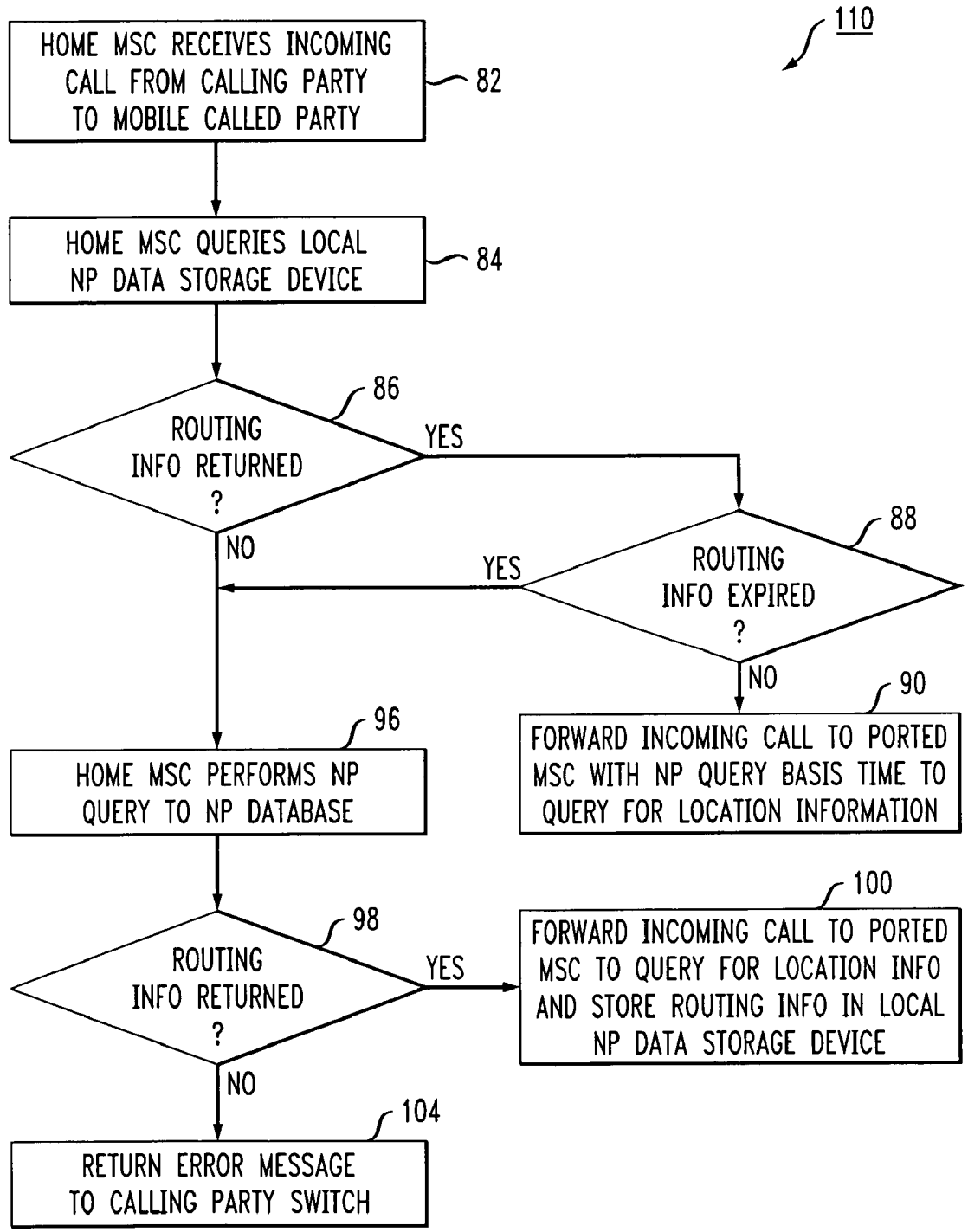
FIG. 4 is a flowchart of another embodiment of a process for a wireless service provider to reduce NP queries for a DN that is ported to a new MSC.

With reference to FIG. 4, an exemplary process 110 for a wireless service provider to reduce NP queries for a DN that is ported to a new MSC begins at step 82 and continues through step 90 in the same manner as described above in reference to FIG. 3.

At step 86, if stored routing information is not included in the return result from the local NP data storage device, the process advances to step 96 and the process continues through step 100 in the same manner as described above in reference to FIG. 3. Notably, this embodiment bypasses the process of querying the home HLR for location information in steps 92, 94, and 100 of FIG. 3.

At step 88, if the stored routing information is expired, the process advances to step 96 and continues in the same manner as described above in reference to FIG. 3.

At step 98, if the current routing information is not included in the return result from the NP database, the process advances to step 104 and the home MSC returns an error message to the calling party switch as described above in reference to FIG. 3.

The various steps in the foregoing process 110 may be implemented by hardware, software, and/or combinations thereof within the home MSC 18 (FIG. 1), home HLR 20 (FIG. 1), local NP data storage device 22 (FIG. 1), and NP database 24 (FIG. 1). More specifically, steps 82, 84, 86, 88, 90, 96, 98, 100, 102, and 104 may be implemented at least in part by hardware, software, and/or combinations thereof within the home MSC 18 (FIG. 1). Steps 84 and 86 may be implemented at least in part by hardware, software, and/or combinations thereof within the local NP data storage device 22 (FIG. 1). Steps 96 and 98 may be implemented at least in part by hardware, software, and/or combinations thereof within the NP database 24 (FIG. 1).

Figure 5:
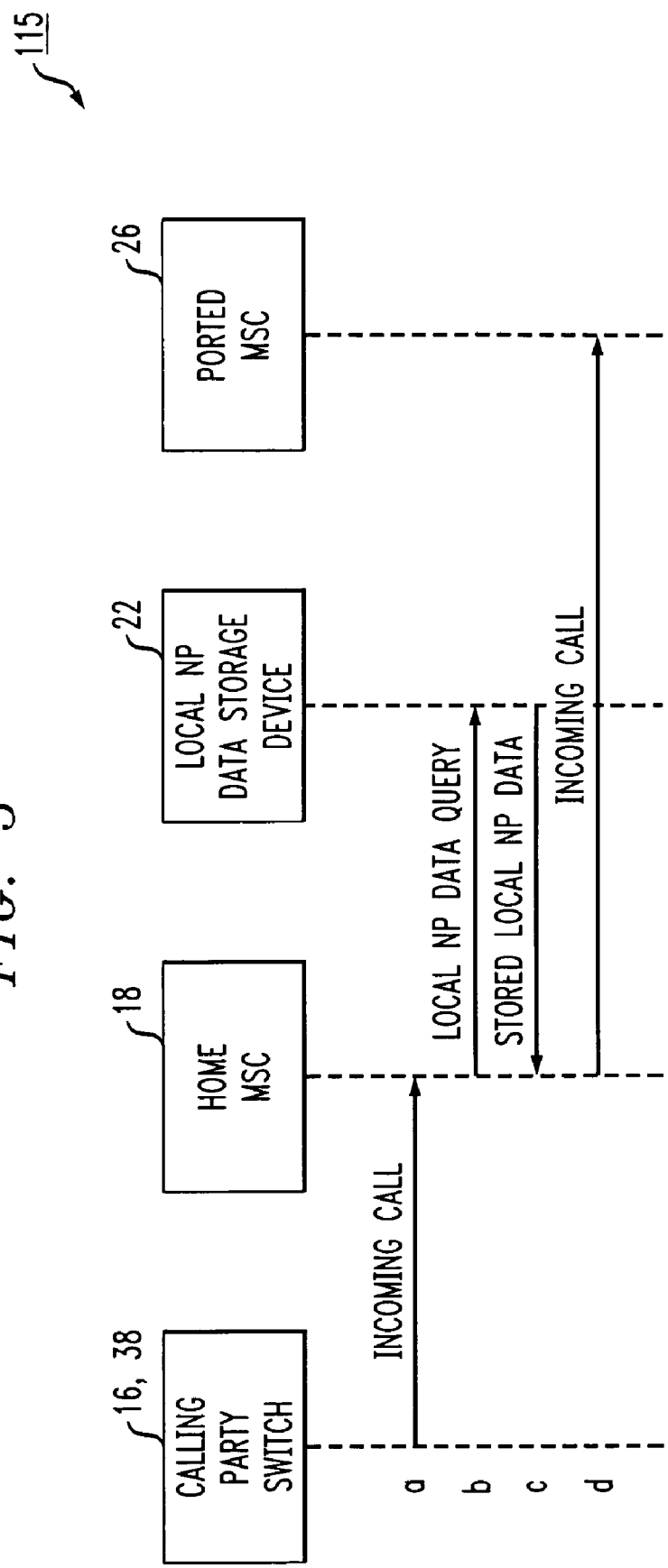
FIG. 5 is a call flow diagram reflecting a portion of the flowcharts in FIGS. 4 and 5 showing processes for a wireless service provider to reduce NP queries for a DN that is ported to a new MSC.

With reference to FIG. 5, a call flow diagram 115 provides another view of the scenarios described above in conjunction with FIGS. 3 and 4 where the wireless service provider avoids an NP query for a DN that is ported to a new MSC. The call flow begins at line a, where the calling party switch (i.e., first MSC 16 or local exchange 38) communicates an incoming call to the DN associated with the second MS 34 to the home MSC 18. At line b, the home MSC 18 sends a query to the local NP data storage device 22 for stored local NP data (i.e., stored routing information) associated with the DN. In response, the local NP data storage device 22 communicates a return result that includes the stored local NP data to the home MSC 18 (line c). The stored local NP data includes information that associates the ported MSC 26 with the DN. At line d, the home MSC 18 forwards the incoming call to the ported MSC 26.

Figure 6:
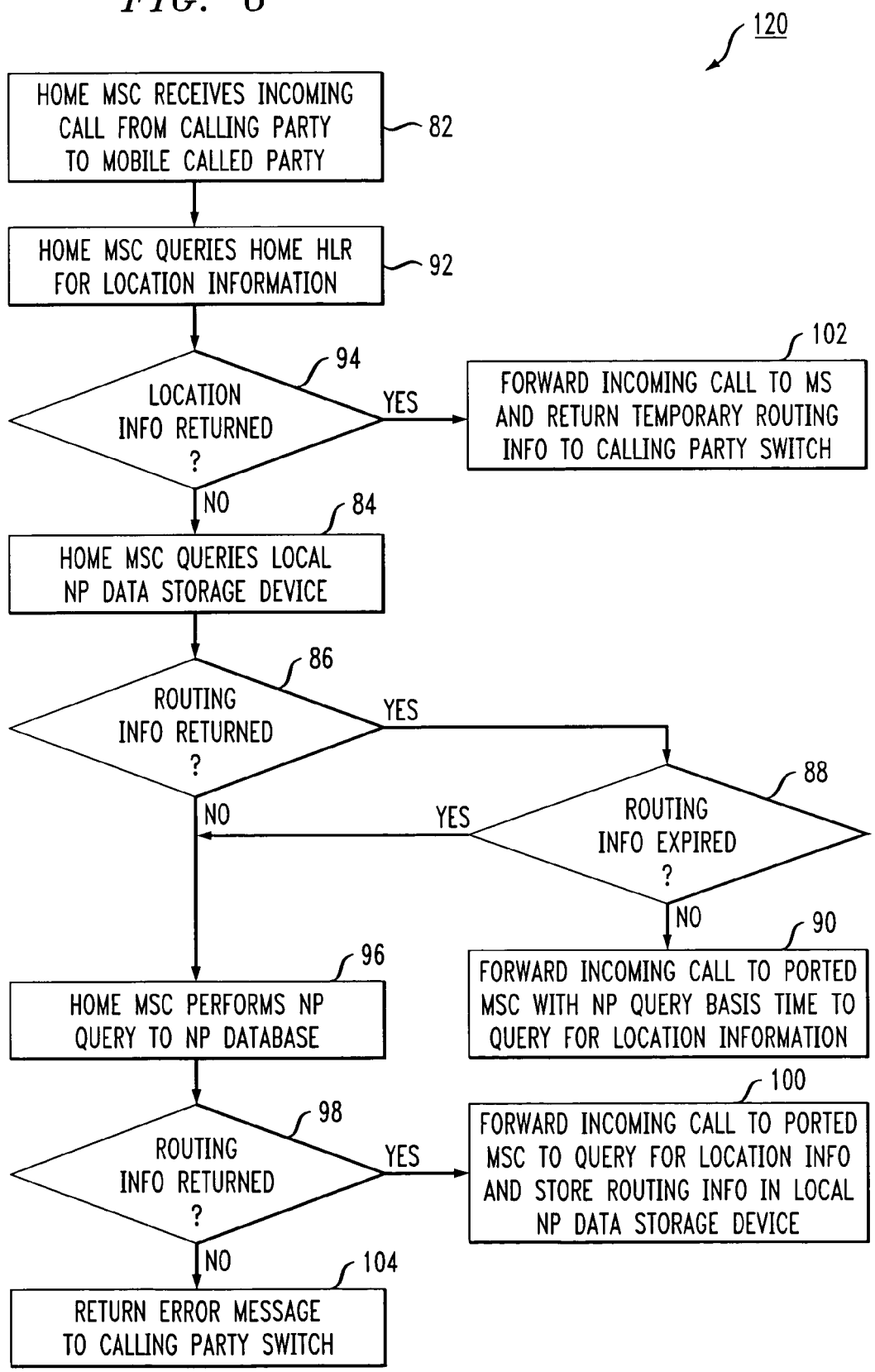
FIG. 6 is a flowchart of still another embodiment of a process for a wireless service provider to reduce NP queries for a DN that is ported to a new MSC.

With reference to FIG. 6, an exemplary process 120 for a wireless service provider to reduce NP queries for a DN that is ported to a new MSC begins at step 82 when a home MSC receives an incoming call from a calling party to a DN associated with a mobile called party and an MS. At step 92, the home MSC queries a home HLR for location information associated with the mobile called party's MS. Next, the process determines if the location information is includes in a return result from the home HLR (step 94). If the return result from the home HLR does not include the location information, at step 84, the home MSC queries a local NP data storage device for stored routing information associated with the DN and time information associated with a data and time when a previous number portability query associated with the DN returned the stored routing information (i.e., NP query basis time). Next, the process determines if the stored routing information is included in a return result from the local NP data storage device (step 86). If stored routing information is included in the return result from the local NP data storage device, at step 88, the process determines if the stored routing information is expired by determining if the time information associated with the stored routing information exceeds a predetermined time threshold. If the stored routing information is not expired, the home MSC forwards the incoming call to a ported MSC associated with the stored routing information, the stored routing information, and the time information (i.e., NP query basis time) so that the ported MSC can obtain location information associated with the mobile called party's MS (step 90).

At step 86, if stored routing information is not included in the return result from the local NP data storage device, the process advances to step 96 and the home MSC queries the NP database for current routing information associated with the DN. Next, the process determines if the current routing information is included in a return result from the NP database (step 98). If the current routing information is included in the return result from the NP database, at step 100, the home MSC forwards the incoming call to a ported MSC associated with the current routing information so that the ported MSC can obtain location information associated with the mobile called party's MS. The home MSC also stores the current routing information and time information associated with a date and time when the associated NP query was performed in the local NP data storage device in relation to the DN.

At step 88, if the stored routing information is expired, the process advances to step 96 and continues as described above.

At step 94, if the return result from the home HLR includes the location information, the process advances to step 102 and the home MSC forwards the incoming call to the called party's MS and returns temporary routing information to a calling party switch.

At step 98, if the current routing information is not included in the return result from the NP database, the process advances to step 104 and the home MSC returns an error message to the calling party switch.

The various steps in the foregoing process 120 may be implemented by hardware, software, and/or combinations thereof within the home MSC 18 (FIG. 1), home HLR 20 (FIG. 1), local NP data storage device 22 (FIG. 1), and NP database 24 (FIG. 1). More specifically, steps 82, 84, 86, 88, 90, 92, 94, 96, 98, 100, 102; and 104 may be implemented at least in part by hardware, software, and/or combinations thereof within the home MSC 18 (FIG. 1). Steps 92 and 94 may be implemented at least in part by hardware, software, and/or combinations thereof within the home HLR 20 (FIG. 1). Steps 84 and 86 may be implemented at least in part by hardware, software, and/or combinations thereof within the local NP data storage device 22 (FIG. 1). Steps 96 and 98 may be implemented at least in part by hardware, software, and/or combinations thereof within the NP database 24 (FIG. 1).

Figure 7:
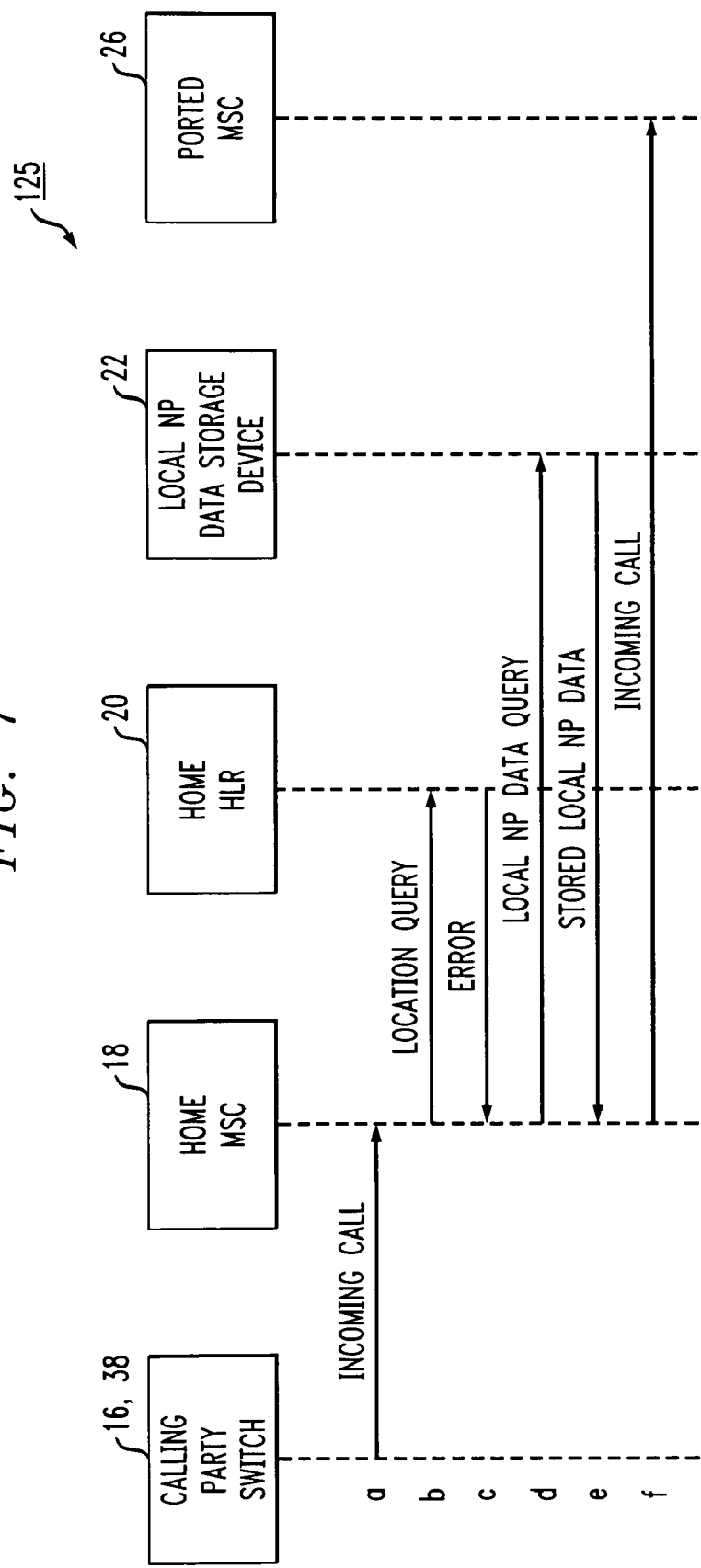
FIG. 7 is a call flow diagram reflecting a portion of the flowchart in FIG. 6 showing a process for a wireless service provider to reduce NP queries for a DN that is ported to a new MSC.

With reference to FIG. 7, a call flow diagram 125 provides another view of the scenario described above in conjunction with FIG. 6 where the wireless service provider avoids an NP query for a DN that is ported to a new MSC. The call flow begins at line a, where the calling party switch (i.e., first MSC 16 or local exchange 38) communicates an incoming call to the DN associated with the second MS 34 to the home MSC 18. At line b, the home MSC 18 sends a location query to the home HLR 20 for location information associated with the DN. In response, the home HLR 20 communicates a return result that includes an error message to the home MSC 18 (line c). At line d, the home MSC 18 sends a query to the local NP data storage device 22 for a stored local NP data (i.e., stored routing information) associated with the DN. In response, the local NP data storage device 22 communicates a return result that includes the stored local NP data to the home MSC 18 (line e). The stored local NP data includes information that associates the ported MSC 26 with the DN. At line f, the home MSC 18 forwards the incoming call to the ported MSC 26.

As can be appreciated from the foregoing, if the routing data obtained from the NP database is stored for future use, the stored routing data, including associated time information, is passed along to other switches in the call path for further usage. The stored routing information and associated time information must be incorporated into current messaging schemes for processing incoming calls. Additionally, as the incoming call is routed using the stored routing information the next switch in the call path may be able to determine whether to accept and use the stored routing data that is passed or reject the stored data and launch its own NP query.

In general, an exemplary embodiment of another aspect of the invention, allows the MSC to populate a routing message type with stored routing data and pass this message along to the next switch in the call path. This routing message is populated when stored routing data is used at an MSC in the wireless network for a ported number in lieu of current results from an NP query. The routing message is formatted and passed along with the time expiration information to the next switch (e.g., an intermediate switch) that can choose to re-use the routing data or ignore the data and launch a new NP query. The routing message may be implemented in the embodiment depicted in FIG. 1 and described above, as well as the embodiment depicted in FIG. 8 and described below.

As an example, a call arrives at old wireless network A for a ported subscriber. Old wireless network A had previously performed an NP query for the number and has stored the routing data, for example, in internal memory, along with a timer. Old wireless network A then routes the call to the next network node (which happens to be an intermediate switch or an inter-exchange carrier (IXC), not the end office destination). In the messaging routed with the call, the new routing location for the subscriber, an indicator bit that marks the routing number as "stored data" (meaning not from the NP database), and an expiration time that matches the timer at old wireless network A is appended.

When the call arrives at the intermediate switch, all the message data is analyzed and the wireless network may continue to route the call based on the routing data passed along, since the timer will not expire for a long period of time, or choose not to route the based on the routing data and launch a new NP query for new routing data. The intermediate switch can also pass along the routing data as it was received, so another intermediate node may use it as well.

The above scenario allows the wireless networks to "team up" and launch possibly one NP query for a DN at the beginning of the call path, store it, and then keep using this NP data until the timer expires. This results in cost savings to one or more wireless service providers.

Currently, when an incoming call is routed an indicator (i.e., forward call indicator (FCI)) is passed to the next switch to indicate that an NP query has already been performed. But this indicator can only be passed if an actual query was launched to the NP database (according to standards), this does not cover cases using stored routing data from a previous NP query.

In one embodiment of the invention, stored NP data is allowed to be passed along with a timer to the next switch or network in the call path. This introduces a routing message set with stored routing information. This does not require that an NP query be performed in order to set the indicator when passing stored data. This permits the recipient switch to also benefit from not having to launch an NP query. Currently if the forward call indicator bit (ISUP) is set to 0, then an NP query may be performed. This invention allows the provider to bypass this setting in the message and look at the stored data indication in the message instead of launching an NP query.

Figure 8:
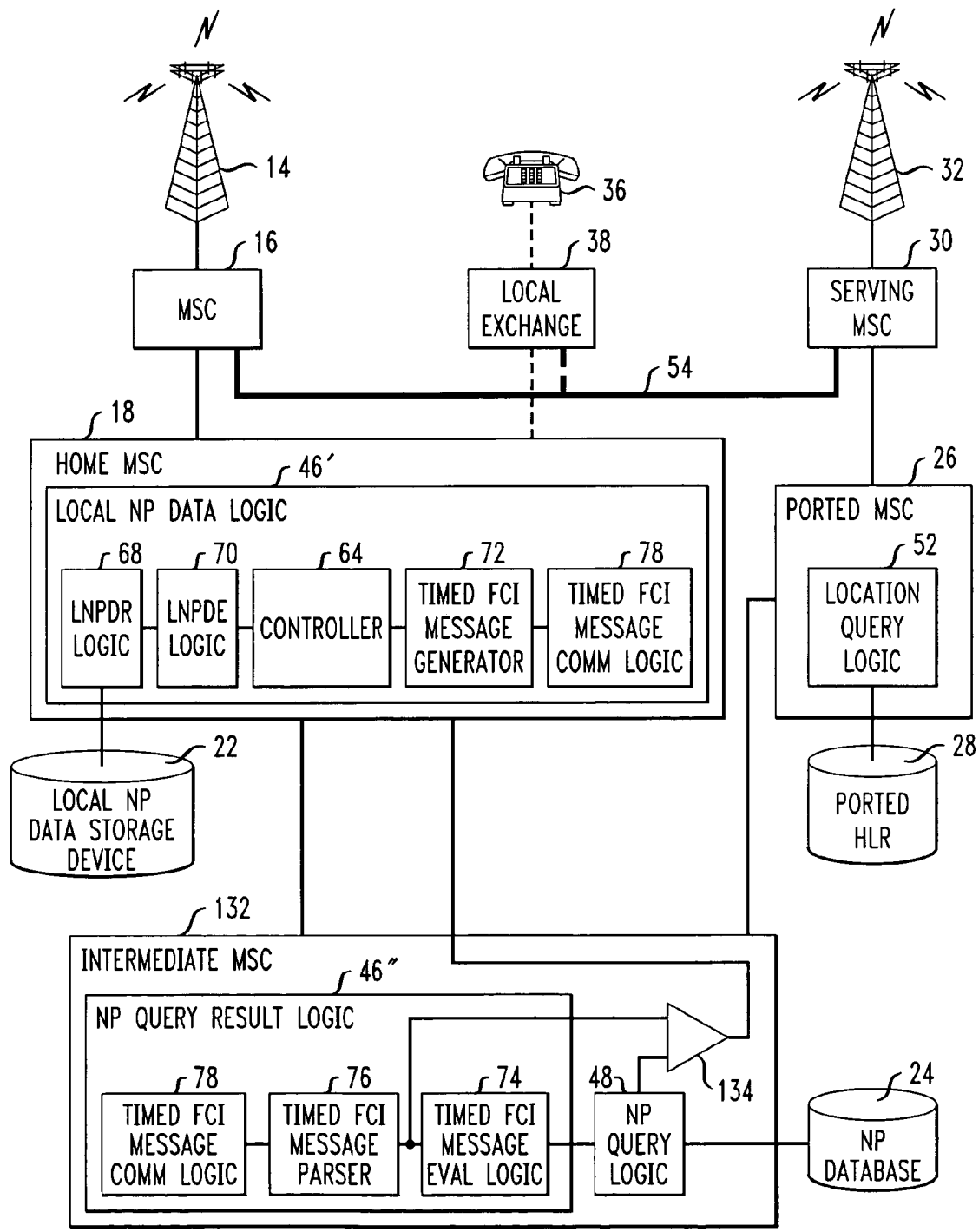
FIG. 8 is a block diagram of an exemplary telecommunication system providing timed forward call indicator (FCI) message handling associated with the local NP query result storage feature reflected in FIGS. 1–7.

With reference to FIG. 8, an exemplary telecommunication system 130 includes the first MS 12, first BS 14, first MSC 16, home MSC 18, local NP data storage device 22, NP database 24, ported MSC 26, ported HLR 28, serving MSC 30, second BS 32, second MS 34, and an intermediate MSC 132. The intermediate MSC 132 is in communication with the home MSC 18 and the ported MSC 26. Generally, the telecommunication system 130 functions in the same manner as described above for the telecommunication system 10 of FIG. 1. Additionally, at least the home MSC 18 and the intermediate MSC 132 incorporate timed forward call indicator (FCI) messaging in conjunction with forwarding an incoming call to a ported MSC associated with stored routing information retrieved from the local NP data storage device 22. This is in reference to the scenario where the home MSC 18 routes an incoming call from the calling party leg to the ported MSC 26. In the embodiment being described, the route for the incoming call to the ported MSC 26 is through the intermediate MSC 132.

In alternate embodiments, one or more additional intermediate MSCs may be added to the called party leg between the home MSC 18 and the ported MSC 26. Such additional MSCs may or may not operate the same as described below for the intermediate MSC 132. Similarly, the features described below associated with the timed FCI messaging may be incorporated within any combination of MSCs participating in the routing of the incoming call to the ported MSC 26.

In the embodiment being described, the home MSC 18 includes a local NP data logic module 46' that operates in the same manner as the local NP data logic module 46 described above in reference to FIG. 1. The local NP data logic module 46' also provides timed FCI messaging generation functions via the controller 64, local NP data retrieval logic 68, local NP data evaluation logic 70, timed FCI message generator 72, and timed FCI message communication logic 78. The intermediate MSC 132 includes the NP query logic module 48, a comparator 134, and a local NP data logic module 46'' that operates in the same manner as the local NP data logic module 46 described above in reference to FIG. 1. The local NP data logic module 46'' also provides timed FCI messaging parsing functions via the timed FCI message evaluation logic 74, timed FCI message parser 76, and timed FCI message communication logic. The ported MSC 26 includes the location query logic module 52. The voice trunk 54 provides a voice channel between the first MSC 16 or local exchange 38 and the serving MSC 30.

It is understood that the various components shown in FIG. 8 may be implemented in hardware, software, or various combinations of hardware and software. Additionally, it is understood that the components may be combined in any suitable manner in actual implementation. For example, the local NP data storage device 22 may be incorporated within the home MSC 18 rather than as an external component.

In an exemplary scenario, a call is initiated by a calling party using the first MS 12 or landline telephone device 34 to a directory number (DN) associated with a called party using the second MS 32. The called party initially subscribed to wireless service to the second MS 32 from a wireless service provider that associated the second MS 32 with the home MSC 18. However, now wireless service for the second MS 32 and associated DN is associated with the ported MSC 26. In other words, the DN has been ported from the home MSC 18 to the ported MSC 26. A recent incoming call to the DN required an NP query and routing information from the NP query result, as well as time information associated with the routing information, has been stored in the local NP data storage device 22 for use in routing subsequent incoming calls to the DN.

Given the initial conditions described above, the scenario begins when the home MSC 18 receives an incoming call to the ported DN associated with the second MS 34. The home MSC 18 no longer provides wireless service to the ported DN. However, as an original or previous provider of wireless service to the ported DN, the home MSC 18 receives all incoming calls to the ported DN and must obtain routing information with which to forward the call. Under these circumstances, the home MSC 18 queries the local NP data storage device 22, via the local NP data retrieval logic 68, for routing information for the ported DN and associated time information before initiating an NP query to the NP database. The routing information and time information is communicated from the local NP data retrieval logic 68 to the local NP data evaluation logic 70.

The local NP data evaluation logic 70 evaluates the time information to determine whether or not to use the stored routing information. This is accomplished by comparing the time information to a predetermined time threshold associated with the routing information (i.e., LRN) that is stored in the LRN time LUT 60 (FIG. 2). The evaluation process is described in more detail above with reference to FIG. 2. In the scenario being described, assume the time information does not exceed the predetermined time threshold (i.e., the stored routing information is not expired). Therefore, the stored routing information is accepted and communicated from the local NP data evaluation logic 70 to the controller 64 along with the associated time information. The controller 64 communicates the stored routing information and associated time information to the timed FCI message generator 72. The controller 64 also communicates the contents of the CDPN buffer 56 (FIG. 2) to the timed FCI message generator 72.

The timed FCI message generator 72 forms a timed FCI message that includes an LRN segment, a CDPN segment, a timed FCI bit, and a time information segment. The timed FCI message generator 72 inserts the stored routing information in the LRN segment, inserts the contents of the CDPN buffer in the CDPN segment, sets the timed FCI bit, and inserts the time information associated with the routing information in the time information segment. The timed FCI message generator 72 communicates the timed FCI message to the timed FCI message communication logic 78. At this point, the home MSC 18 suitably inserts the timed FCI message in the overall messaging associated with forwarding the incoming call to the ported MSC 26. The home MSC 18 forwards the incoming call with the timed FCI message to the ported MSC 26 via the intermediate MSC 132.

The overall messaging associated with the incoming call is evaluated by the intermediate MSC 132 and the timed FCI message is communicated to the local NP data logic module 46". The timed FCI message is received by the timed FCI message communication logic 78 within the local NP data logic module 46" and communicated to the timed FCI message parser 76. The timed FCI message parser 76 isolates the routing information, DN, and time information from the LRN message segment, CDPN message segment, and time information message segment, respectively. At least the time information is communicated by the timed FCI message parser 76 to the timed FCI message evaluation logic 74.

The timed FCI message evaluation logic 74 evaluates the time information to determine whether or not to use the stored routing information. This is accomplished by comparing the time information to a predetermined time threshold associated with the routing information (i.e., LRN) that is, for example, stored in the LRN time LUT 60 (FIG. 2). For example, the evaluation process may be the same as the evaluation performed by the local NP data evaluation logic 70 described above in more detail with reference to FIG. 2. However, the predetermined time thresholds used by the home MSC 18 and the intermediate MSC 132 are not necessarily the same value, particularly if the home MSC 18 and the intermediate MSC 132 are associated with different wireless service providers. Hence, depending on the circumstances, what is acceptable to the home MSC 18 may not necessarily be acceptable to the intermediate MSC 132. When this is the case, the intermediate MSC 132 rejects the stored routing information and performs an NP query to obtain current routing information for forwarding the incoming call.

In the scenario being described, assume that the time information exceeds the predetermined time threshold in the comparison made by the timed FCI message evaluation logic 74 and the intermediate MSC 132 thereby rejects the stored routing information. The timed FCI message evaluation logic 74 communicates an error message to the NP query logic 48 indicating that the stored routing information is rejected. The NP query logic 48 queries the NP database 24 for current routing information associated with the DN. In the scenario being described, assume that the return result from the NP database 24 includes the current routing information. The current routing information may be the same as the stored routing information or different from the stored routing information. If the current routing information is different from the stored routing information, the intermediate MSC 132 may inform the home MSC 18 that the stored routing information associated with the DN in its local NP data storage device 22 is not accurate. The intermediate MSC 132 may also be able to charge the home MSC 18 for the cost of performing the NP query when the stored routing information was not correct.

In the scenario being described, assume that the current routing information is different from the stored routing information. The stored routing information is communicated from the timed FCI message parser 76 to the comparator 134. The current routing information is communicated from the NP query logic 48 to the comparator 134. The comparator 134 compares the current routing information to the stored routing information and, in this case, determines that it is different. The intermediate MSC 132 communicates a message from the comparator 134 to the home MSC 18 that identifies that stored routing information associated with the DN provided by the home MSC is being overridden because it is not accurate. This override stored routing information message may include one or more of the DN, current routing information associate with the DN which associates the DN with another ported MSC different from the ported MSC identified by the home MSC, and time information associated with the date and time when the NP query associated with the current routing information was performed. The home MSC 18 may respond to the message by deleting the stored routing information associated with the DN from the local NP data storage device 22. Alternatively, the home MSC 18 may overwrite the stored routing information and associated time information with the current routing information and time information associated therewith.

The intermediate MSC 132 forwards the incoming call to the ported MSC 26 associated with the current routing information using a normal FCI message. The ported MSC 26 receives the incoming call and the location query logic 52 queries the ported HLR 28 for location information regarding the second MS 34 in the normal manner. If the second MS is powered on and the subscriber's account is active with the wireless service provider associated with the ported MSC 26, the ported HLR 28 provides a return result to the location query logic 52 that includes the location information. Since the second MS 34 is roaming in a geographic area served by the serving MSC 30 in this scenario, the location information includes information that identifies the serving MSC 30. The ported MSC 26 uses the location information to forward the incoming call to the serving MSC 26 in the normal manner. The serving MSC 30 receives the incoming call and continues call processing in the normal manner. Eventually, the incoming call is routed from the serving MSC 30 to the second MS 34 via the second BS 32. After the incoming call is answered by the subscriber or another user at the second MS 34, a voice channel is connected from the incoming call leg to the serving MSC 30 via the voice trunk 54 in the normal manner.

In another scenario, where the stored routing information is accepted by the timed FCI message evaluation logic 74 in the intermediate MSC 132, the timed FCI message evaluation logic 74 communicates the timed FCI message to the controller 64 (FIG. 2) within the local NP data logic module 46". The controller 64 (FIG. 2) may interpret this as acceptance of the stored routing information and communicate the timed FCI message to the timed FCI message generator 72 (FIG. 2) within the local NP data logic module 46". The timed FCI message generator 72 (FIG. 2) communicates the timed FCI message to the timed FCI message communication logic 78. At this point, the intermediate MSC 132 suitably inserts the timed FCI message in the overall messaging associated with forwarding the incoming call to the ported MSC 26. The intermediate MSC 132 forwards the incoming call with the timed FCI message to the ported MSC 26 via the intermediate MSC 132.

In an alternate embodiment, the timed FCI message may be merged with the normal FCI message by adding fields to the normal FCI message for the timed FCI bit and the time information segment.

Figure 9:
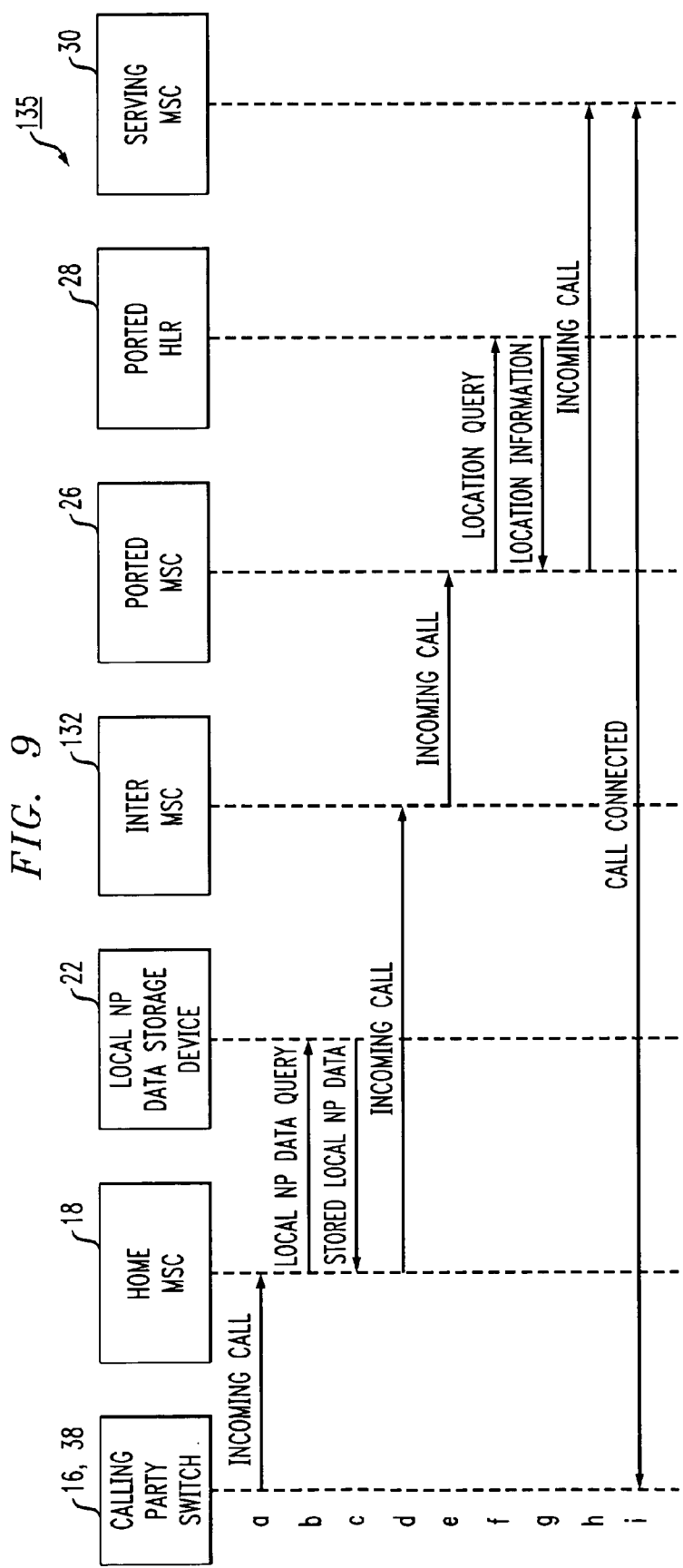
FIG. 9 is a call flow diagram for an exemplary embodiment of call processing in a wireless network for an incoming call to a subscriber that is ported to a new MSC.

With reference to FIG. 9, a call flow diagram 135 provides another view of the scenario described above in conjunction with FIG. 8 where a wireless service provider avoids an NP query for a DN that is ported to a new MSC and the incoming call to the DN is forwarded from a home MSC to the new MSC via an intermediate MSC. The call flow begins at line a, where the calling party switch (i.e., first MSC 16 or local exchange 38) communicates an incoming call to the DN associated with the second MS 34 to the home MSC 18. At line b, the home MSC 18 sends a query to the local NP data storage device 22 for a stored local NP data (i.e., stored routing information) associated with the DN. In response, the local NP data storage device 22 communicates a return result that includes the stored local NP data to the home MSC 18 (line c). The stored local NP data includes information that associates the ported MSC 26 with the DN. At line d, the home MSC 18 forwards the incoming call to the intermediate MSC 132. Next, the intermediate MSC 132, after accepting the stored routing information, forwards the incoming call to the ported MSC 26 (line e). At line f, the ported MSC 26 sends a location query message to the ported HLR 28 for location information associated with the DN. In response, the ported HLR 28 returns a location information message to the ported MSC 26 (line g).

At line h, having located the second MS 34, the ported MSC 26 forwards the incoming call to the serving MSC 30. This rings the second MS 34. When the incoming call is answered, the call is connected between the calling party switch 16, 38 and the serving MSC 30 via the voice trunk 54 (FIG. 8) (line i).

Figure 10:
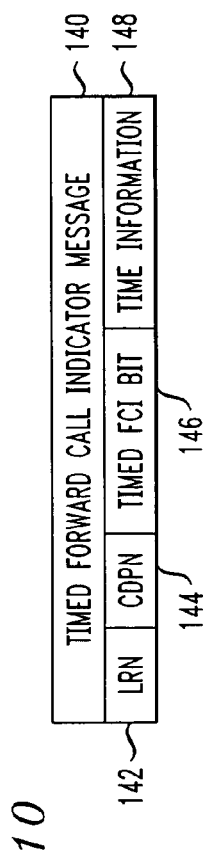
FIG. 10 depicts an exemplary timed FCI message associated with the message handling infrastructure shown in FIG. 6.

With reference to FIG. 10, an exemplary timed FCI message format 140 includes an LRN segment 142, a CDPN segment 144, a timed FCI bit 146, and a time information segment 148. The LRN segment 142 contains routing information associated with an incoming call. The CDPN segment 144 contains the DN associated with the incoming call. The timed FCI bit 146 indicates whether or not the routing information was retrieved from a local NP data storage device 22 (FIGS. 1 and 8) (i.e., stored routing information) or an NP database 24 (FIGS. 1 and 8) (i.e., current routing information). As discussed above in reference to FIG. 8, the depicted timed FCI message format may be incorporated in the normal FCI message format by adding the timed FCI bit 146 and time information segment 148 fields to the normal FCI message format rather than creating an additional and separate message format.

Figure 11:
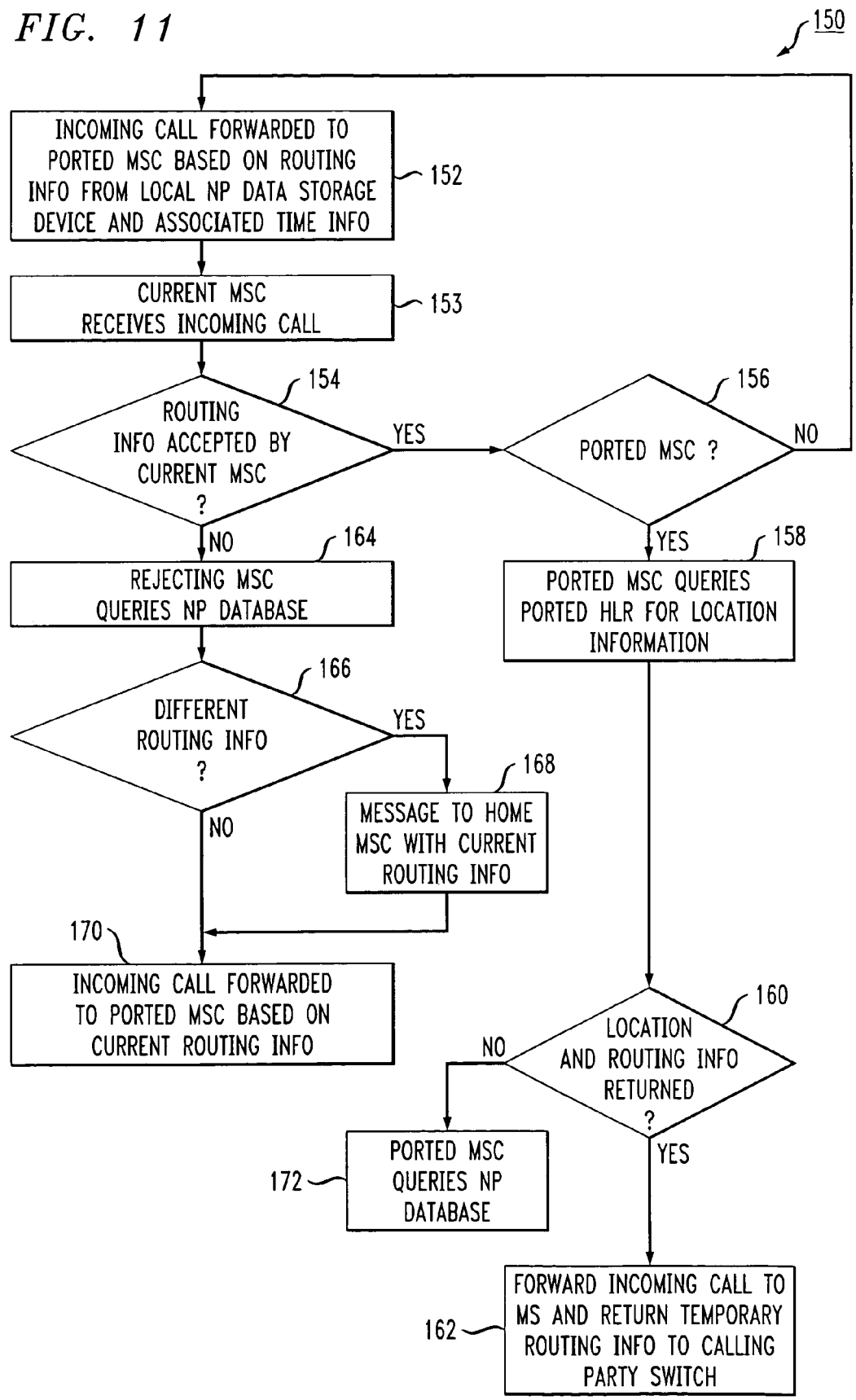
FIG. 11 is a flowchart of an exemplary process for timed FCI message handling in an intermediate MSC associated with the infrastructure shown in FIG. 6.

With reference to FIG. 11, an exemplary process 150 for timed FCI message handling in an intermediate MSC begins at step 152 where an incoming call from a calling party to a DN associated with a mobile called party and an MS is forwarded to a ported MSC based on stored routing information associated with the DN and time information associated with the stored routing information. The stored routing information and associated time information returned from a local NP data storage device in response to a query. The time information being associated with a date and time when a previous NP query associated with the DN returned the stored routing information. Next, an MSC through which the incoming call is routed (i.e., current MSC) receives the incoming call (step 153). Notably, the current MSC may be the ported MSC or an intermediate MSC. At step 154, the process determines whether the stored routing information is accepted by a current MSC (i.e., the MSC currently processing the incoming call). If the current MSC accepts the stored routing information, the process determines if the current MSC is the ported MSC (step 156). If the current MSC is the ported MSC, at step 158, the ported MSC query a ported HLR for location information associated with the DN. Next, the process determines if the location information is returned by the ported HLR (step 160). If the location information was returned by the ported HLR, at step 162, the ported MSC forwards the incoming call to the MS via a serving MSC associated with the location information and returns temporary routing information to the calling party switch.

At step 154, if the current MSC does not accept the stored routing information, the process advances to step 164 and the rejecting MSC queries the NP database for current routing information. Next, the process determines if the current routing information is different from the stored routing information (step 166). If the current routing information is different from the stored routing information, at step 168, the rejecting MSC sends a message to the home MSC indicating that the stored routing information is being overridden by the rejecting MSC because it is not accurate. This override stored routing information message may include one or more of the DN, current routing information associate with the DN which associates the DN with another ported MSC different from the ported MSC identified by the home MSC, and time information associated with the date and time when the NP query associated with the current routing information was performed. The home MSC may simply delete the stored routing information associated with the DN from the local NP data storage device. Alternatively, the home MSC may overwrite the stored routing information and associated time information with the current routing information and time information associated therewith. Next, the rejecting MSC forwards the incoming call to a ported MSC associated with the current routing information (step 170).

At step 156, if the current MSC is not the ported MSC (i.e., it is an intermediate MSC), the process returns to step 152 where the current intermediate MSC forwards the incoming call to the ported MSC based on the stored routing information and time information associated with the stored routing information.

At step 166, if the current routing information is different from the stored routing information, the process advances to step 170 and the rejecting MSC forwards the incoming call to the ported MSC associated with the current routing information.

At step 160, if the location information was not returned by the ported HLR, the process advances to step 172 and the ported MSC queries the NP database for current routing information.

The various steps in the foregoing process 150 may be implemented by hardware, software, and/or combinations thereof within the intermediate MSC 132 (FIG. 8), NP database 24 (FIG. 8), ported MSC 26 (FIG. 8), and ported HLR 28 (FIG. 8). More specifically, steps 152, 154, 156, 164, 166, 168, and 170 may be implemented at least in part by hardware, software, and/or combinations thereof within the intermediate MSC 132 (FIG. 8). Steps 164 and 172 may be implemented at least in part by hardware, software, and/or combinations thereof within the NP database 24 (FIG. 8). Steps 152, 154, 156, 158, 160, 162, 164, 166, 168, 170, and 172 may be implemented at least in part by hardware, software, and/or combinations thereof within the period MSC 26 (FIG. 8). Steps 158 and 160 may be implemented at least in part by hardware, software, and/or combinations thereof within the ported HLR 28 (FIG. 8).

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

I claim:

1. A method of relating a directory number to a mobile station in a wireless network for an incoming call from a calling party using a calling party device to a called party using the mobile station, wherein the directory number is associated with a first mobile switching center and wireless service to the mobile station is associated with a second mobile switching center, the method including the steps:

a) the first mobile switching center querying a local number portability data storage device, in lieu of querying an external number portability database, for stored routing information associated with the directory number and time information associated with a date and time when a previous number portability query associated with the directory number returned the stored routing information;

b) receiving a return result from the local number portability data storage device;

c) determining if the return result from the local number portability data storage device includes the stored routing information;

d) determining if the stored routing information is expired by determining if the time information associated with the stored routing information exceeds a first predetermined time threshold;

e) if the return result from the local number portability data storage device includes the stored routing information and if the stored routing information is not expired, forwarding the incoming call and the stored routing information to the second mobile switching center, wherein the stored routing information associates the directory number with the second mobile switching center;

f) if the stored routing information is expired or if the return result from the local number portability data storage device does not include the stored routing information, querying the external number portability database for current routing information associated with the directory number;

g) receiving a return result from the external number portability database;

h) determining if the return result from the external number portability database includes the current routing information;

i) if the return result from the external number portability database includes the current routing information, forwarding the incoming call and the current routing information to a third mobile switching center, wherein the current routing information associates the directory number with the third mobile switching center; and j) storing the current routing information and time information associated with a date and time when the associated number portability query was performed in the local number portability data storage device in relation to the directory number.

2. A method of relating a directory number to a mobile station in a wireless network for an incoming call from a calling party using a calling party device to a called party using the mobile station, wherein the directory number is associated with a first mobile switching center and wireless service to the mobile station is associated with a second mobile switching center, the method including the steps:

a) the first mobile switching center querying a local number portability data storage device, in lieu of querying an external number portability database, for stored routing information associated with the directory number and time information associated with a date and time when a previous number portability query associated with the directory number returned the stored routing information;

b) receiving a return result from the local number portability data storage device;

c) determining if the return result from the local number portability data storage device includes the stored routing information;

d) determining if the stored routing information is expired by determining if the time information associated with the stored routing information exceeds a first predetermined time threshold;

e) if the return result from the local number portability data storage device includes the stored routing information and if the stored routing information is not expired, forwarding the incoming call and the stored routing information to the second mobile switching center, wherein the stored routing information associates the directory number with the second mobile switching center;

f) if the return result from the local number portability data storage device does not include the stored routing information, querying a home location register associated with the first mobile switching center for location information associated with the mobile station;

g) receiving a return result from the home location register;

h) determining if the return result from the home location register includes the location information;

i) if the return result from the home location register does not include the location information, querying an external number portability database for current routing information associated with the directory number;

j) receiving a return result from the external number portability database;

k) determining if the return result from the external number portability database includes the current routing information;

l) if the return result from the external number portability database includes the current routing information, forwarding the incoming call and the current routing information to the second mobile switching center, wherein the current routing information associates the directory number with the second mobile switching center; and m) storing the current routing information and time information associated with a date and time when the associated number portability query was performed in the local number portability data storage device in relation to the directory number.

3. A method of relating a directory number to a mobile station in a wireless network for an incoming call from a calling party using a calling party device to a called party using the mobile station, wherein the directory number is associated with a first mobile switching center and wireless service to the mobile station is associated with a second mobile switching center, the method including the steps:

a) the first mobile switching center querying a local number portability data storage device, in lieu of querying an external number portability database, for stored routing information associated with the directory number and time information associated with a date and time when a previous number portability query associated with the directory number returned the stored routing information;

b) receiving a return result from the local number portability data storage device;

c) determining if the return result from the local number portability data storage device includes the stored routing information;

d) determining if the stored routing information is expired by determining if the time information associated with the stored routing information exceeds a first predetermined time threshold;

e) if the return result from the local number portability data storage device includes the stored routing information and if the stored routing information is not expired, forwarding the incoming call and the stored routing information to the second mobile switching center, wherein the stored routing information associates the directory number with the second mobile switching center;

f) if the return result from the local number portability data storage device does not include the stored routing information, querying a home location register associated with the first mobile switching center for location information associated with the mobile station;

g) receiving a return result from the home location register;

h) determining if the return result from the home location register includes the location information;

i) if the return result from the home location register does not include the location information, querying an external number portability database for current routing information associated with the directory number;

j) receiving a return result from the external number portability database;

k) determining if the return result from the external number portability database includes the current routing information;

l) if the return result from the external number portability database includes the current routing information, forwarding the incoming call and the current routing information to a third mobile switching center, wherein the current routing information associates the directory number with the third mobile switching center; and m) storing the current routing information and time information associated with a date and time when the associated number portability query was performed in the local number portability data storage device in relation to the directory number.

4. The method set forth in claim 1, further including the steps:

f) if the stored routing information is expired, or if the return result from the local number portability data storage device does not include the stored routing information, querying an external number portability database for current routing information associated with the directory number;

g) receiving a return result from the external number portability database;

h) determining if the return result from the external number portability database includes the current routing information;

i) if the return result from the external number portability database includes the current routing information, forwarding the incoming call and the current routing information to the second mobile switching center, wherein the current routing information associates the directory number with the second mobile switching center; and j) storing the current routing information and time information associated with a date and time when the associated number portability query was performed in the local number portability data storage device in relation to the directory number.

5. A method of relating a directory number to a mobile station in a wireless network for an incoming call from a calling party using a calling party device to a called party using the mobile station, wherein the directory number is associated with a first mobile switching center and wireless service to the mobile station is associated with a second mobile switching center, the method including the steps:

a) querying a local number portability data storage device for stored routing information associated with the directory number and time information associated with a date and time when a previous number portability query associated with the directory number returned the stored routing information;

b) receiving a return result from the local number portability data storage device;

c) determining if the return result from the local number portability data storage device includes the stored routing information;

d) determining if the stored routing information is expired by determining if the time information associated with the stored routing information exceeds a first predetermined time threshold;

e) if the return result from the local number portability data storage device includes the stored routing information and if the stored routing information is not expired, forwarding the incoming call and the stored routing information to the second mobile switching center, wherein the stored routing information associates the directory number with the second mobile switching center wherein the forwarding from the first mobile switching center to the second mobile switching center is via an intermediate mobile switching center;

f) receiving the forwarded incoming call and the stored routing information from the first mobile switching center at the intermediate mobile switching center;

g) determining whether or not to accept the stored routing information at the intermediate mobile switching center using predetermined standards; and h) if the stored routing information is accepted by the intermediate mobile switching center, forwarding the incoming call and the routing information from the intermediate mobile switching center to the second mobile switching center.

6. The method set forth in claim 5, further including the steps:

i) if the stored routing information is not accepted by the intermediate mobile switching center, querying an external number portability database for current routing information associated with the directory number; and j) receiving a return result from the external number portability database, wherein the return result includes the current routing information.

7. The method set forth in claim 6 wherein the current routing information associates the directory number with the second mobile switching center, further including the step:

k) forwarding the incoming call and the current routing information from the intermediate switching center to the second mobile switching center.

8. The method set forth in claim 6 wherein the current routing information associates the directory number with a third mobile switching center, further including the step:
 k) forwarding the incoming call and the current routing information from the intermediate switching center to the third mobile switching center.

9. The method set forth in claim 8, further including the step:
 l) communicating an override stored routing information message from the intermediate mobile switching center to the first mobile switching center including at least one of the directory number, current routing information associated with the directory number which associates the directory number with the third mobile switching center, and time information associated with a date and time when the number portability query associated with the current routing information was performed.

10. The method set forth in claim 9, further including the step:
 m) receiving the override stored routing information message from the intermediate mobile switching center at the first mobile switching center; and
 n) deleting the current routing information and associated time information stored in relation to the directory number from the local number portability data storage device.

11. The method set forth in claim 5 wherein the time information is forwarded along with the stored routing information in step e) and the predetermined standards in step g) include at least one of: i) accepting all stored routing information, ii) accepting the stored routing information if the time information does not exceed a second predetermined time threshold, and iii) accepting no stored routing information.

12. The method set forth in claim 1 wherein the time information is forwarded along with the stored routing information in step e) and the stored routing information and time information is forwarded to the second mobile switching center in a timed forward call indicator message.

13. The method set forth in claim 12 wherein the timed forward call indicator message includes at least one of a local routing number segment, a called party number segment, a timed forward call indicator bit, and a time information segment, wherein the local routing number segment is based on the stored routing information, wherein the timed forward call indicator bit indicates stored routing information is provided in the timed forward call indicator message, wherein the time information segment is based on the time information associated with the stored routing information.

14. The method set forth in claim 1 wherein the time information includes at least one of: i) a timestamp reflecting an approximate date and time when the previous number portability query that returned the stored routing information for the directory number was performed, ii) a timestamp reflecting a date and time after which the stored routing information is considered expired by the first mobile switching center, and iii) a value reflecting an amount of time until the first mobile switching center considers the stored routing information expired.

15. A method of relating a directory number to a mobile station in a wireless network for an incoming call from a calling party using a calling party device to a called party using the mobile station, wherein the directory number is associated with a first mobile switching center and wireless service to the mobile station is associated with a second mobile switching center, the method including the steps:
 a) querying a local number portability data storage device for stored routing information associated with the directory number and time information associated with a date and time when a previous number portability query associated with the directory number returned the stored routing information;
 b) receiving a return result from the local number portability data storage device;
 c) determining if the return result from the local number portability data storage device includes the stored routing information;
 d) determining if the stored routing information is expired by determining if the time information associated with the stored routing information exceeds a first predetermined time threshold;
 e) if the return result from the local number portability data storage device does not include the stored routing information, advancing to step k), otherwise, if the stored routing information is not expired, forwarding the incoming call and the stored routing information to the second mobile switching center and the process is ended, wherein the stored routing information associates the directory number with the second mobile switching center;
 f) querying an external number portability database for current routing information associated with the directory number;
 g) receiving a return result from the external number portability database;
 h) determining if the return result from the external number portability database includes the current routing information;
 i) if the return result from the external number portability database includes the current routing information, forwarding the incoming call and the current routing information to the second mobile switching center, wherein the current routing information associates the directory number with the second mobile switching center;
 j) storing the current routing information and time information associated with a date and time when the associated number portability query was performed in the local number portability data storage device in relation to the directory number and the process is ended;
 k) querying a home location register associated with the first mobile switching center for location information associated with the mobile station;
 l) receiving a return result from the home location register;
 m) determining if the return result from the home location register includes the location information;
 n) if the return result from the home location register includes the location information includes the location information, forwarding the incoming call to the mobile station and returning temporary routing information to a telecommunication switch serving the calling party and the process is ended, otherwise continuing the process with step f).

16. The method set forth in claim 15 wherein the forwarding from the first mobile switching center to the second mobile switching center in step e) is via an intermediate mobile switching center, in conjunction with step e), further including the steps:
 o) receiving the forwarded incoming call and the stored routing information from the first mobile switching center at the intermediate mobile switching center;

p) determining whether or not to accept the stored routing information at the intermediate mobile switching center using predetermined standards; and q) if the stored routing information is accepted by the intermediate mobile switching center, forwarding the incoming call and the routing information from the intermediate switching center to the second mobile switching center.

17. The method set forth in claim 16, in conjunction with step e), further including the steps:

r) if the stored routing information is not accepted by the intermediate mobile switching center, querying an external number portability database for current routing information associated with the directory number; and s) receiving a return result from the external number portability database, wherein the return result includes the current routing information.

18. The method set forth in claim 17 wherein the current routing information associates the directory number with the second mobile switching center, in conjunction with step e), further including the step:

t) forwarding the incoming call and the current routing information from the intermediate switching center to the second mobile switching center.

19. The method set forth in claim 17 wherein the current routing information associates the directory number with a third mobile switching center, in conjunction with step e), further including the step:

t) forwarding the incoming call and the current routing information from the intermediate switching center to the third mobile switching center.

20. The method set forth in claim 19, in conjunction with step e), further including the step:

u) communicating an override stored routing information message from the intermediate mobile switching center to the first mobile switching center including the directory number, current routing information associated with the directory number which associates the directory number with the third mobile switching center, and time information associated with a data and time when the number portability query associated with the current routing information was performed.

21. The method set forth in claim 20, in conjunction with step e), further including the step:

v) receiving the override stored routing information message from the intermediate mobile switching center at the first mobile switching center; and w) storing the current routing information and time information received in the override stored routing information message in the local number portability data storage device in association with the directory number.

22. A telecommunication system for relating a directory number to a mobile station for an incoming call from a calling party using a calling party device to a called party using the mobile station, the telecommunication system including:

a first mobile switching center associated with the directory number;

a local number portability data storage device in communication with the first mobile switching center; and a second mobile switching center in operative communication with the first mobile switching center and associated with wireless service to the mobile station;

a home location register in communication with the first mobile switching center; and an external number portability database in communication with the first mobile switching center; and the first mobile switching center further including:

means for querying a local number portability data storage device, in lieu of querying an associated external number portability database, for stored routing information associated with the directory number and time information associated with a date and time when a previous number portability query associated with the directory number returned the stored routing information;

means for receiving a return result from the local number portability data storage device;

means for determining if the return result from the local number portability data storage device includes the stored routing information;

means for determining if the stored routing information is expired by determining if the time information exceeds a first predetermined time threshold;

means for forwarding the incoming call and the stored routing information to the second mobile switching center if the return result from the local number portability data storage device includes the stored routing information and if the stored routing information is not expired, wherein the stored routing information associates the directory number with the second mobile switching center;

means for querying the home location register associated with the first mobile switching center for location information associated with the mobile station if the return result from the local number portability data storage device does not include the stored routing information;

means for receiving a return result from the home location register;

means for determining if the return result from the home location register includes the location information;

means for querying the number portability database for current routing information associated with the directory number if the return result from the home location register does not include the location information;

means for receiving a return result from the number portability database;

means for determining if the return result from the number portability database includes the current routing information;

means for forwarding the incoming call and the current routing information to the second mobile switching center if the return result from the number portability database includes the current routing information, wherein the current routing information associates the directory number with the second mobile switching center; and means for storing the current routing information and time information associated with a date and time when the associated number portability query was performed in the local number portability data storage device in relation to the directory number.

23. A telecommunication system for relating a directory number to a mobile station for an incoming call from a calling party using a calling party device to a called party using the mobile station, the telecommunication system including:

a first mobile switching center associated with the directory number;

a local number portability data storage device in communication with the first mobile switching center; and a second mobile switching center in operative communication with the first mobile switching center and associated with wireless service to the mobile station; and the first mobile switching center further including:
means for querying a local number portability data storage device for stored routing information associated with the directory number and time information associated with a date and time when a previous number portability query associated with the directory number returned the stored routing information;
means for receiving a return result from the local number portability data storage device;
means for determining if the return result from the local number portability data storage device includes the stored routing information;
means for determining if the stored routing information is expired by determining if the time information exceeds a first predetermined time threshold;
means for forwarding the incoming call and the stored routing information to the second mobile switching center if the return result from the local number portability data storage device includes the stored routing information and if the stored routing information is not expired, wherein the stored routing information associates the directory number with the second mobile switching center; an intermediate mobile switching center in operative communication with the first and second mobile switching centers, wherein the forwarding of the incoming call and the stored routing information from the first mobile switching center to the second mobile switching center is via the intermediate mobile switching center, the intermediate mobile switching center further including:
means for receiving the forwarded incoming call and the stored routing information from the first mobile switching center;
means for determining whether or not to accept the stored routing information using predetermined standards; and
means for forwarding the incoming call and the routing information to the second mobile switching center if the stored routing information is accepted.

24. The telecommunication system set forth in claim 23, further including:
a number portability database in communication with the intermediate mobile switching center; and
the intermediate mobile switching center further including:
means for querying the number portability database for current routing information associated with the directory number if the stored routing information is not accepted; and
means for receiving a return result from the number portability database, wherein the return result includes the current routing information.

25. The telecommunication system set forth in claim 24 wherein the current routing information associates the directory number with the second mobile switching center, the intermediate mobile switching center further including:
means for forwarding the incoming call and the current routing information from the intermediate mobile switching center to the second mobile switching center.

26. The telecommunication system set forth in claim 24 wherein the current routing information associates the directory number with a third mobile switching center, the intermediate mobile switching center further including:
means for forwarding the incoming call and the current routing information from the intermediate mobile switching center to the third mobile switching center.

27. The telecommunication system set forth in claim 26, the intermediate mobile switching center further including:
means for communicating an override stored routing information message from the intermediate mobile switching center to the first mobile switching center including the directory number, current routing information associated with the directory number which associates the directory number with the third mobile switching center, and time information associated with a date and time when the number portability query associated with the current routing information was performed.

28. The telecommunication system set forth in claim 27, the first mobile switching center further including:
means for receiving the override stored routing information message from the intermediate mobile switching center; and
means for storing the current routing information and time information received in the override stored routing information message in the local number portability data storage device in relation to the directory number.

29. The method set forth in claim 2, further including the steps:
f) if the stored routing information is expired, or if the return result from the local number portability data storage device does not include the stored routing information, querying an external number portability database for current routing information associated with the directory number;
g) receiving a return result from the external number portability database;
h) determining if the return result from the external number portability database includes the current routing information;
i) if the return result from the external number portability database includes the current routing information, forwarding the incoming call and the current routing information to the second mobile switching center, wherein the current routing information associates the directory number with the second mobile switching center; and
j) storing the current routing information and time information associated with a date and time when the associated number portability query was performed in the local number portability data storage device in relation to the directory number.

30. The method set forth in claim 3, further including the steps:
f) if the stored routing information is expired, or if the return result from the local number portability data storage device does not include the stored routing information, querying an external number portability database for current routing information associated with the directory number;
g) receiving a return result from the external number portability database;
h) determining if the return result from the external number portability database includes the current routing information;
i) if the return result from the external number portability database includes the current routing information, forwarding the incoming call and the current routing information to the second mobile switching center, wherein the current routing information associates the directory number with the second mobile switching center; and j) storing the current routing information and time information associated with a date and time when the associated number portability query was performed in the local number portability data storage device in relation to the directory number.

31. The method set forth in claim 2 wherein the time information is forwarded along with the stored routing information in step e) and the stored routing information and time information is forwarded to the second mobile switching center in a timed forward call indicator message.

32. The method set forth in claim 31 wherein the timed forward call indicator message includes at least one of a local routing number segment, a called party number segment, a timed forward call indicator bit, and a time information segment, wherein the local routing number segment is based on the stored routing information, wherein the timed forward call indicator bit indicates stored routing information is provided in the timed forward call indicator message, wherein the time information segment is based on the time information associated with the stored routing information.

33. The method set forth in claim 3 wherein the time information is forwarded along with the stored routing information in step e) and the stored routing information and time information is forwarded to the second mobile switching center in a timed forward call indicator message.

34. The method set forth in claim 33 wherein the timed forward call indicator message includes at least one of a local routing number segment, a called party number segment, a timed forward call indicator bit, and a time information segment, wherein the local routing number segment is based on the stored routing information, wherein the timed forward call indicator bit indicates stored routing information is provided in the timed forward call indicator message, wherein the time information segment is based on the time information associated with the stored routing information.

35. The method set forth in claim 2 wherein the time information includes at least one of: i) a timestamp reflecting an approximate date and time when the previous number portability query that returned the stored routing information for the directory number was performed, ii) a timestamp reflecting a date and time after which the stored routing information is considered expired by the first mobile switching center, and iii) a value reflecting an amount of time until the first mobile switching center considers the stored routing information expired.

36. The method set forth in claim 3 wherein the time information includes at least one of: i) a timestamp reflecting an approximate date and time when the previous number portability query that returned the stored routing information for the directory number was performed, ii) a timestamp reflecting a date and time after which the stored routing information is considered expired by the first mobile switching center, and iii) a value reflecting an amount of time until the first mobile switching center considers the stored routing information expired.

* * * * *